US006965815B1

(12) United States Patent
Tompkins et al.

(10) Patent No.: US 6,965,815 B1
(45) Date of Patent: *Nov. 15, 2005

(54) SPA CONTROL SYSTEM

(75) Inventors: Michael E. Tompkins, Houston, TX (US); Michael J. Green, Houston, TX (US)

(73) Assignee: Bilboa Instruments, Inc., Tustin, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/043,799

(22) Filed: Jan. 9, 2002

Related U.S. Application Data

(63) Continuation of application No. 09/761,264, filed on Jan. 16, 2001, which is a continuation of application No. 08/822,179, filed on Mar. 20, 1997, now Pat. No. 6,253,227, which is a continuation of application No. 08/703,177, filed on Aug. 23, 1996, now abandoned, which is a continuation of application No. 08/327,927, filed on Oct. 24, 1994, now Pat. No. 5,559,720, which is a continuation of application No. 08/225,282, filed on Jan. 11, 1994, now Pat. No. 5,361,215, which is a continuation of application No. 07/224,869, filed on Jul. 26, 1988, now abandoned, which is a continuation-in-part of application No. 07/054,581, filed on May 27, 1987, now abandoned.

(51) Int. Cl.[7] ............................................. G05D 23/00
(52) U.S. Cl. ........................... 700/300; 700/282; 4/493; 4/541.1
(58) Field of Search .............................. 700/275–278, 700/281, 282, 299, 300; 236/12.1–12.15, 20 R–21 B, 91 R, 91 C–91 F, 93 R–98 B, 101; 4/488, 492, 493, 538, 541.1–595

(56) References Cited

U.S. PATENT DOCUMENTS

| | | | |
|---|---|---|---|
| 3,400,374 A | 9/1968 | Schumann | 340/172.5 |
| 3,459,925 A | 8/1969 | Goosey et al. | 235/151 |
| 3,498,286 A | 3/1970 | Polanyi et al. | 128/2 |
| 3,781,925 A | 1/1974 | Curtis et al. | 4/443 |
| 3,836,959 A | 9/1974 | Pao et al. | 340/148 |
| 3,837,016 A | 9/1974 | Schindler et al. | 4/172.17 |
| 3,886,544 A | 5/1975 | Narodny | 340/365 |

(Continued)

FOREIGN PATENT DOCUMENTS

| | | | |
|---|---|---|---|
| DE | 32 09 635 A1 | 9/1983 | A61H/33/02 |
| DE | 3306807 | 8/1984 | |
| DE | 33 08 862 A1 | 9/1984 | F24H/9/20 |
| DE | 35 11 499 A1 | 10/1986 | A61H/33/06 |
| EP | 0 009 249 | 9/1979 | |
| EP | 0 286 941 A1 | 10/1988 | A61H/33/00 |
| FR | 2 562 687 A1 | 10/1985 | |

(Continued)

OTHER PUBLICATIONS

App. No. EP 88 10 5389 Search Report.
Motorola Microprocessor, Microcontroller, and Peripheral Data, vol. 1, 1988.

(Continued)

*Primary Examiner*—Maria N. Von Buhr
(74) *Attorney, Agent, or Firm*—Fulwider Patton Lee & Utecht LLP

(57) ABSTRACT

An improved spa control system is disclosed. The invention describes a spa control system which calculates the time required to heat the water in the spa system to a desired temperature. From that information, the heating rate of the spa system can be determined, and the heating element of the spa system can be activated at the proper time to raise the temperature of the water to a selected temperature by a desired time. The spa system also monitors information which might show errors in the operation of the spa system such as a blockage in the flow of water over the heating element in the spa system.

38 Claims, 9 Drawing Sheets

U.S. PATENT DOCUMENTS

| | | | |
|---|---|---|---|
| 3,910,678 A | 10/1975 | McCartney | 350/96 |
| 3,937,952 A | 2/1976 | Ripley et al. | 250/227 |
| 3,972,603 A | 8/1976 | Lubinec | 352/4 |
| 4,001,557 A | 1/1977 | Stephenson | 235/151.1 |
| 4,048,852 A | 9/1977 | Sakakibara et al. | 73/193 R |
| 4,071,745 A | 1/1978 | Hall | 364/104 |
| 4,114,442 A | 9/1978 | Pratt | 73/341 |
| 4,116,228 A | 9/1978 | Hudspeth et al. | 128/2 R |
| 4,121,574 A | 10/1978 | Lester | 128/2.05 R |
| 4,122,719 A | 10/1978 | Carlson et al. | 73/342 |
| 4,123,796 A | 10/1978 | Shih | 364/900 |
| 4,133,036 A | 1/1979 | Watson | 364/477 |
| 4,158,965 A | 6/1979 | Prosky | 73/362 |
| 4,161,880 A | 7/1979 | Prosky | 73/342 |
| 4,162,486 A | 7/1979 | Wyler | 340/310 |
| 4,169,293 A | 10/1979 | Weaver | 4/178 |
| 4,174,517 A | 11/1979 | Mandel | 340/310 |
| 4,198,676 A | 4/1980 | Varnum et al. | 364/557 |
| 4,204,204 A | 5/1980 | Pitstick | 340/712 |
| 4,212,078 A | 7/1980 | Games et al. | 364/900 |
| 4,215,398 A | 7/1980 | Burkett et al. | 364/101 |
| 4,237,562 A | 12/1980 | DuPont | 4/543 |
| 4,265,298 A | 5/1981 | Sumner, Jr. et al. | 165/2 |
| 4,266,599 A | 5/1981 | Saunders et al. | 165/2 |
| 4,269,261 A | 5/1981 | Kountz et al. | 165/2 |
| 4,270,693 A | 6/1981 | Hayes | 236/46 F |
| 4,274,145 A | 6/1981 | Hendricks et al. | 364/557 |
| 4,274,705 A | 6/1981 | Miller | 350/96.15 |
| 4,275,266 A | 6/1981 | Lasar | 179/1 VC |
| 4,275,382 A | 6/1981 | Jannotta | 340/451 |
| 4,276,603 A | 6/1981 | Beck et al. | 364/477 |
| 4,276,925 A | 7/1981 | Palmieri | 165/12 |
| 4,284,126 A | 8/1981 | Dawson | 165/11 A |
| 4,290,551 A | 9/1981 | Johnstone | 236/9 R |
| 4,292,542 A | 9/1981 | Bajka | 307/28 |
| 4,293,028 A | 10/1981 | Knoll | 165/12 |
| 4,298,946 A | 11/1981 | Hartsell et al. | 364/557 |
| 4,300,199 A | 11/1981 | Yoknis et al. | 364/557 |
| 4,300,909 A | 11/1981 | Krumhansl | 23/230 |
| 4,307,576 A | 12/1981 | Takano et al. | 62/204 |
| 4,308,911 A | 1/1982 | Mandl | 165/22 |
| 4,308,991 A | 1/1982 | Peinetti et al. | 236/46 R |
| 4,314,665 A | 2/1982 | Levine | 236/46 R |
| 4,316,256 A | 2/1982 | Hendricks et al. | 364/505 |
| 4,319,711 A | 3/1982 | Barker et al. | 236/46 R |
| 4,322,031 A | 3/1982 | Gehlert | 236/12 R |
| 4,322,297 A | 3/1982 | Bajka | 210/742 |
| 4,324,138 A | 4/1982 | Davis et al. | 73/341 |
| 4,330,081 A | 5/1982 | McMillan | 236/12 R |
| 4,334,518 A | 6/1982 | Ort | 126/132 |
| 4,349,434 A | 9/1982 | Jaworski | 210/94 |
| 4,353,412 A | 10/1982 | Krumhansl | 165/59 |
| 4,353,502 A | 10/1982 | Myers | 236/47 |
| 4,361,274 A | 11/1982 | Raleigh | 236/21 B |
| 4,368,991 A | 1/1983 | Hentze | 374/12 |
| 4,370,534 A | 1/1983 | Brandon | 219/10.55 A |
| 4,381,031 A | 4/1983 | Whitaker et al. | 165/299 |
| 4,381,075 A | 4/1983 | Cargill et al. | 237/8 R |
| 4,382,544 A | 5/1983 | Stewart | 236/46 R |
| 4,385,724 A | 5/1983 | Ramsauer et al. | 236/25 A |
| 4,386,649 A | 6/1983 | Hines et al. | 165/12 |
| 4,398,789 A | 8/1983 | Pryor | 350/96.1 |
| 4,403,296 A | 9/1983 | Prosky | 364/573 |
| 4,404,697 A | 9/1983 | Hatcher | 4/492 |
| 4,406,401 A | 9/1983 | Nettro | 236/12.12 |
| 4,406,550 A | 9/1983 | Gray | 374/110 |
| 4,409,662 A | 10/1983 | Rao | 364/557 |
| 4,409,694 A | 10/1983 | Barrett, Sr. et al. | 4/545 |
| 4,410,791 A | 10/1983 | Eastep | 219/307 |
| 4,420,032 A | 12/1983 | Van Koppen et al. | 165/1 |
| 4,420,811 A | 12/1983 | Tarnay et al. | 364/510 |
| 4,420,947 A | 12/1983 | Yoshino | 62/160 |
| 4,421,269 A | 12/1983 | Ts'ao | 236/12.12 |
| 4,421,270 A | 12/1983 | Raleigh et al. | 236/20 R |
| 4,428,528 A | 1/1984 | Renault | 236/46 R |
| 4,432,210 A | 2/1984 | Saito | 62/126 |
| 4,436,610 A | 3/1984 | Enzer et al. | 204/400 |
| 4,446,913 A | 5/1984 | Krocker | 165/12 |
| 4,450,829 A | 5/1984 | Morita et al. | 126/362 |
| 4,466,749 A | 8/1984 | Cunningham et al. | 374/134 |
| 4,480,312 A | 10/1984 | Wingate | 364/557 |
| 4,489,235 A | 12/1984 | Porteous | 249/437 |
| 4,494,526 A | 1/1985 | Wurst et al. | 126/419 |
| 4,497,031 A | 1/1985 | Froehling et al. | 364/505 |
| 4,504,010 A | 3/1985 | Sukimoto et al. | 236/46 F |
| 4,508,261 A | 4/1985 | Blank | 236/20 R |
| 4,527,246 A | 7/1985 | Masson | 364/505 |
| 4,527,247 A | 7/1985 | Kaiser et al. | 364/550 |
| 4,529,033 A | 7/1985 | Blum | 165/39 |
| 4,539,632 A | 9/1985 | Hansen et al. | 364/143 |
| 4,554,688 A | 11/1985 | Puccerella | 4/191 |
| 4,563,780 A | 1/1986 | Pollack | 4/192 |
| 4,564,962 A | 1/1986 | Castleberry et al. | 4/543 |
| 4,574,871 A | 3/1986 | Parkinson et al. | 165/1 |
| 4,594,500 A | 6/1986 | Wright | 219/296 |
| 4,600,879 A | 7/1986 | Scully et al. | 324/58.5 A |
| 4,607,787 A | 8/1986 | Rogers, III | 236/11 |
| 4,610,142 A | 9/1986 | Davis | 62/3 |
| 4,618,091 A | 10/1986 | Buzzi | 236/12.12 |
| 4,621,613 A | 11/1986 | Krumhansl | 126/563 |
| 4,625,096 A | 11/1986 | Fletcher | 239/331 |
| 4,642,785 A | 2/1987 | Packard et al. | 364/557 |
| 4,644,478 A | 2/1987 | Stephens et al. | 364/550 |
| 4,645,908 A | 2/1987 | Jones | 219/378 |
| 4,663,613 A | 5/1987 | Raleigh et al. | 340/607 |
| 4,669,049 A | 5/1987 | Kosednar et al. | 364/557 |
| 4,676,914 A | 6/1987 | Mills et al. | 210/741 |
| 4,682,728 A | 7/1987 | Oudenhoven et al. | 236/12.12 |
| 4,685,307 A | 8/1987 | Jones | 62/160 |
| 4,688,273 A | 8/1987 | Lyng | 4/192 |
| 4,693,415 A | 9/1987 | Sturm | 236/12.12 |
| 4,696,428 A | 9/1987 | Shakalis | 236/12.12 |
| 4,700,884 A | 10/1987 | Barrett et al. | 236/121.2 |
| 4,702,305 A | 10/1987 | Beckey et al. | 165/12 |
| 4,706,882 A | 11/1987 | Barnard | 236/46 R |
| 4,711,392 A | 12/1987 | Kidouchi et al. | 236/12.12 |
| 4,713,525 A | 12/1987 | Eastep | 219/308 |
| 4,713,783 A | 12/1987 | Fletcher | 364/557 |
| 4,718,248 A | 1/1988 | Fisher | 62/238.7 |
| 4,725,001 A | 2/1988 | Carney et al. | 236/11 |
| 4,739,467 A * | 4/1988 | Furusawa | 700/28 |
| 4,742,456 A | 5/1988 | Kamena | 364/400 |
| 4,752,141 A | 6/1988 | Sun et al. | 374/161 |
| 4,757,943 A | 7/1988 | Sperling et al. | 236/12.12 |
| 4,762,980 A | 8/1988 | Insley | 219/307 |
| 4,763,365 A | 8/1988 | Gerondale et al. | 4/493 |
| 4,768,705 A | 9/1988 | Tsutsui et al. | 236/12.12 |
| 4,770,037 A | 9/1988 | Noir et al. | 73/204 |
| 4,770,540 A | 9/1988 | Chague et al. | 374/17 |
| 4,773,008 A | 9/1988 | Schroeder et al. | 364/400 |
| 4,775,245 A | 10/1988 | Hagerman et al. | 374/134 |
| 4,775,776 A | 10/1988 | Rahn et al. | 219/388 |
| 4,780,917 A | 11/1988 | Hancock | 4/541.2 |
| 4,797,958 A | 1/1989 | Guzzini | 4/542 |
| 4,809,516 A | 3/1989 | Jones | 62/160 |
| 4,816,987 A * | 3/1989 | Brooks et al. | 700/45 |
| 4,854,498 A | 8/1989 | Stayton | 236/12.12 |
| RE33,119 E | 11/1989 | Baker | 374/102 |
| 5,226,408 A | 7/1993 | Drysdale | 126/247 |
| 5,245,221 A | 9/1993 | Schmidt et al. | 307/112 |
| 5,278,455 A | 1/1994 | Hamos | 307/139 |

| | | | |
|---|---|---|---|
| 5,283,915 A | 2/1994 | Idland et al. | 4/541.1 |
| 5,287,567 A | 2/1994 | Eash et al. | 4/493 |
| 5,333,325 A | 8/1994 | Levien et al. | 4/584 |
| 5,341,527 A | 8/1994 | Schmidt et al. | 4/592 |
| 5,361,215 A | 11/1994 | Tompkins et al. | 700/300 |
| RE35,018 E | 8/1995 | Homan | 236/12.12 |
| 5,457,826 A | 10/1995 | Haraga et al. | 4/541.4 |
| 5,550,753 A | 8/1996 | Tompkins et al. | 700/300 |
| 5,559,720 A | 9/1996 | Tompkins et al. | 700/300 |
| 6,014,677 A | 1/2000 | Hayashi et al. | 707/501 |

FOREIGN PATENT DOCUMENTS

| | | | |
|---|---|---|---|
| GB | 2 094 503 A | 9/1982 | |
| GB | 2 204 966 A | 11/1988 | |
| GB | 2 211 331 A | 6/1989 | F24H/9/20 |
| JP | 53-125164 | 11/1978 | F24H/9/20 |
| JP | 55-112646 | 8/1980 | F24H/9/20 |
| JP | 55-135912 | 10/1980 | G05D/9/12 |
| JP | 57-157954 | 9/1982 | F24H/9/20 |
| JP | 57-182044 | 11/1982 | F24H/9/20 |
| JP | 58-75660 | 5/1983 | F24H/9/20 |
| JP | 58-109996 | 6/1983 | G08B/21/00 |
| JP | 58-119037 | 7/1983 | F23N/5/26 |
| JP | 58-179728 | 10/1983 | H04Q/9/00 |
| JP | 59-72892 | 4/1984 | F24H/1/22 |
| JP | 59-215535 | 12/1984 | F24H/1/22 |
| JP | 60-8652 | 1/1985 | F24H/1/18 |
| JP | 60-14041 | 1/1985 | F24H/1/22 |
| JP | 60-14042 | 1/1985 | F24H/1/22 |
| JP | 60-17657 | 1/1985 | F24H/1/18 |
| JP | 60-26239 | 2/1985 | F24H/1/10 |
| JP | 60-148691 | 8/1985 | G08B/19/00 |
| JP | 60-155848 | 8/1985 | F24H/1/00 |
| JP | 60-186644 | 9/1985 | F24H/1/18 |
| JP | 60-213731 | 10/1985 | F23N/5/20 |
| JP | 61-11551 | 1/1986 | F24H/1/20 |
| JP | 61-13254 | 1/1986 | F24H/1/20 |
| JP | 61-15444 | 1/1986 | F24H/1/00 |
| JP | 61-18467 | 1/1986 | F24H/5/18 |
| JP | 61-107048 | 5/1986 | F24H/9/20 |
| JP | 61-110842 | 5/1986 | F24H/9/00 |
| JP | 61-184354 | 8/1986 | F24H/1/00 |
| JP | 62-108954 | 5/1987 | F24H/1/00 |
| JP | 60-14677 | 1/2000 | 707/501 |

OTHER PUBLICATIONS

Newspaper article: Mary Kay Seff, "Bathrooms are getting pretty splashy," San Diego Union Tribune, May 9, 1986.

Newsweek artilce: Givens and Springen, "Splish, Splash, it's more than a bath," May 5, 1986.

Newspaper artilce: Teresa Foreman, "Pieces of Yesterday Graced with Touches of Tomorrow," The Record, May 4, 1986.

Newspaper article: "Spring Home '86; Shorts and fillers," UPI, BC Cycle, Mar. 27, 1986.

Newspaper artilce: "Dial a dub dub," The Financial Post (Toronto), Mar. 22, 1986.

Newspaper article: Frederika Randall, "Designers put the bathroom in its place high tech makes it a nice place to visit," Chicago Tribune, Mar. 9, 1986.

Newspaper article: Frederika Randall, "Baths of the future at a fair in Milan," New York Times, Feb. 13, 1986.

Agreement between Siege Industries, Inc. and ICS Development, Inc., dated Mar. 23, 1987.

Jury instructions and questions, Siege Industries, Inc. v. Clark Mfg, Inc., et al., no date.

Advertising for Applied Computer Controls SC 100 spa controller, no date.

Advertising for ACC Spa controller products with photos of a SP–200 skid pack, etc. no date.

Photograph of an ACC SC–200 circuit board, no date.

Photograph of SC–200 spa control board connected to control panel and thermistor, no date.

Photograph of SC–200 control panel, no date.

Software code for SC–200 spa control board, no date.

SC–200 Operation and Instruction Manual, no Date.

Electronic Engineer's Handbook, McGraw–Hill Book Co.; 1982.

Compool CP2000 "The Complete Pool & Spa Control System", no. Date.

Plaintiff Siege's Opposition to Defendants' Motion for Judgment as a Matter of Law; Case No. H–94–3180, no date.

Plaintiff Siege's Opposition to Defendants' Requested Findings of Fact and Conclusions of Law Regarding Inequitable Conduct; Case No. H–94–3180, no date.

Plaintiff Siege's Motion to Enjoin Defendatns from Furthur Infringement of Siege's United States Patent No. 5,361,215; Case No. H–94–3180, no date.

Deposition of Ronald G. Bliss; Case No. H–94–3180, no date.

Defendants' Proposed Findings of Fact and Conclusions of Law Regarding Inequitable Conduct; Case No. H–94–3180, no date.

Plaintiff Siege's Opposition to Defendatns' Motion for Judgment as a Matter of Law; Case No. H–94–3180, no date.

Memorandum in Support of Defendants' Requested Findings of Fact and Conclusion of Law Regarding Inequitable Conduct; Case No. H–94–3180, no date.

Defendants' Notice of Patent Invalidity Pursuant to 35 U.S.C. §282; Case No. H–94–3180, no date.

Defendants' Response to Plaintiff's Bench Memorandum on Claim Construction; Case No. H–94–3180, no date.

Defendants' Response to Plaintiff's Bench memorandum re 35 U.S.C. §102(g) Defense; Case No. H–94–3180, no date.

Siege's Memorandum of Law on the Issue of Claim Construction; Case No. H–94–3180, no date.

Siege's Supplemental memorandum of Law on the Construction of Claims 1 and 37; Case No. H–94–3180, no date.

Siege's Bench Memorandum on Defendants' §102(g) Defense; Case No. H–94–3180, no date.

Memorandum of Points and Authorities in Opposition to Siege's Motion for Dismissal of Complaint; Case No. SACV96–834–LHM, no date.

Declaration of David Cline in Support of Opposition to Siege's Motion for Dismissal of Compliant; Case No. SACV96–834–LHM, no date.

Declaration of Joseph A. Walker in Support of Opposition to Siege's Motion for Dismissal of Complaint; Case No. SACV96–834–LHM, no date.

Memorandum of Points and Authorities in Opposition to Siege's Motion for dismissal of Complaint and in Response to the Court's Request for Briefing of the Stay Issue; Case No. SACV96–834–LHM, no date.

Declaration of Joseph A. Walker in Support of Opposition to Siege's Motion for Dismissal of the Complaint; Case No. SACV96–834–LHM, no date.

Declaration of David Cline in Support of Opposition to Siege's Motion for Dismissal of the Complaint; Case No. SACV96–834–LHM, no date.

Declaration of Joseph Stone in Support of Opposition to Siege's Motion for Dismissal of the Complaint; Case No. SACV96–834–LHM, no date.

Ex Parte Application to File First Amended and Supplemental Complaint for Declaratory Judgment of Noninfringement, Invalidity and Unenforceability of Patents; Case No. SACV 96–834–LHM, No date.

Declaration of Jospeh A. Walker in Support of Ex Parte Application to File First Amended and Supplemetnal Complaint for Declaratory Judgment of Noninfringement, Invalidity and Unenforceability of Patens; Case No. SAVC 96–834–LHM, no date.

Notice of Motion and Motion for Relief from Order Dismissal Compliant and for Reconsideration; Memorandum of Points and Authorities and Declaration of Joseph A. Walker in Support Thereof; Case No. SACV 96–834–LHM, no date.

Notice of Motion and Motion to File a Second Amended and Supplemental Complaint; Memorandum of Points and Authorities and Declaration of Joseph A. Walker in Support Thereof; Case No. SACV 96–834–LHM, no date.

Ex Parte Application to Extend Time to File Notice of Appeal; memorandum of Points and Authorities in Support Thereof; Case No. SACV 96–834–LHM, no date.

Declaration of Joseph A. Walker in Support of Ex Parte Application to Extend Time to File Notice of Appeal; Case No. SACV 96–834–LHM, no date.

Answer of Defendant Balboa Instruments, Inc.; Case No. H–96–3105, no date.

Plaintiff's Reply to Defendant's Opposition to Plaintiff's Motion for Reconsideration; Case No. SACV 096–834–LHM, no date.

* cited by examiner

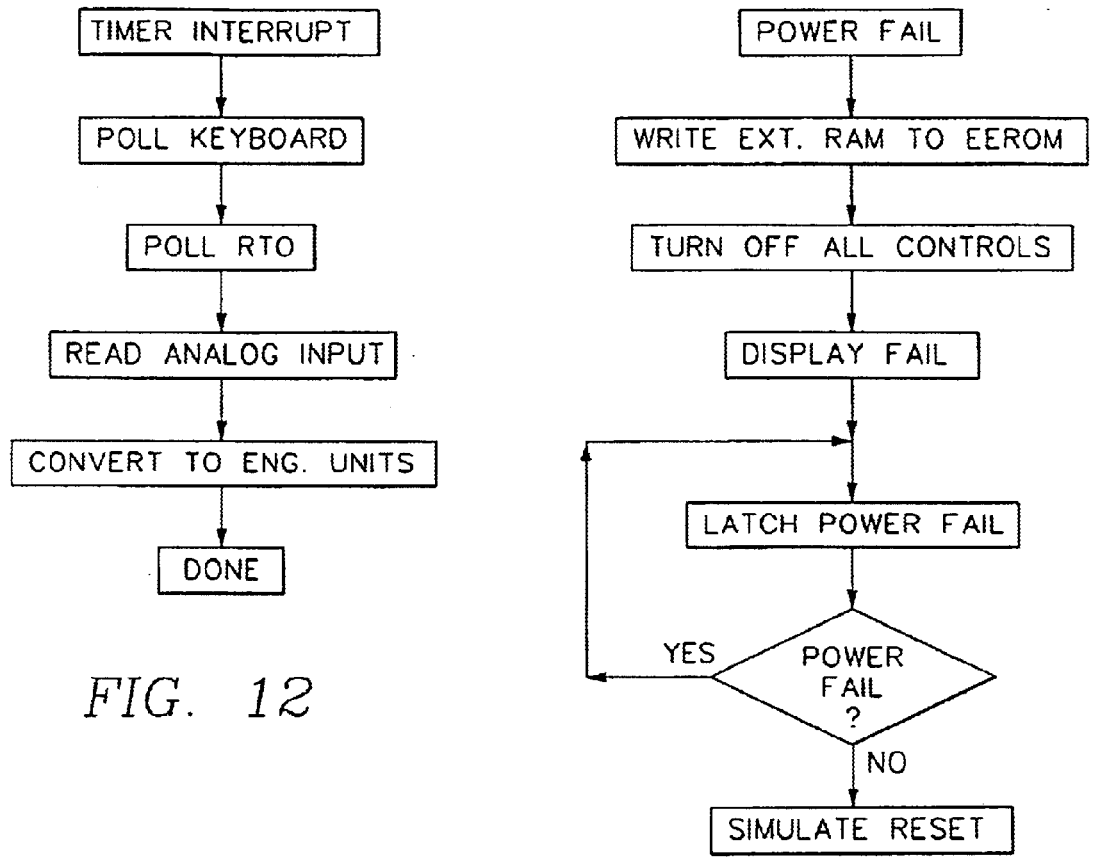
FIG. 12
FIG. 13
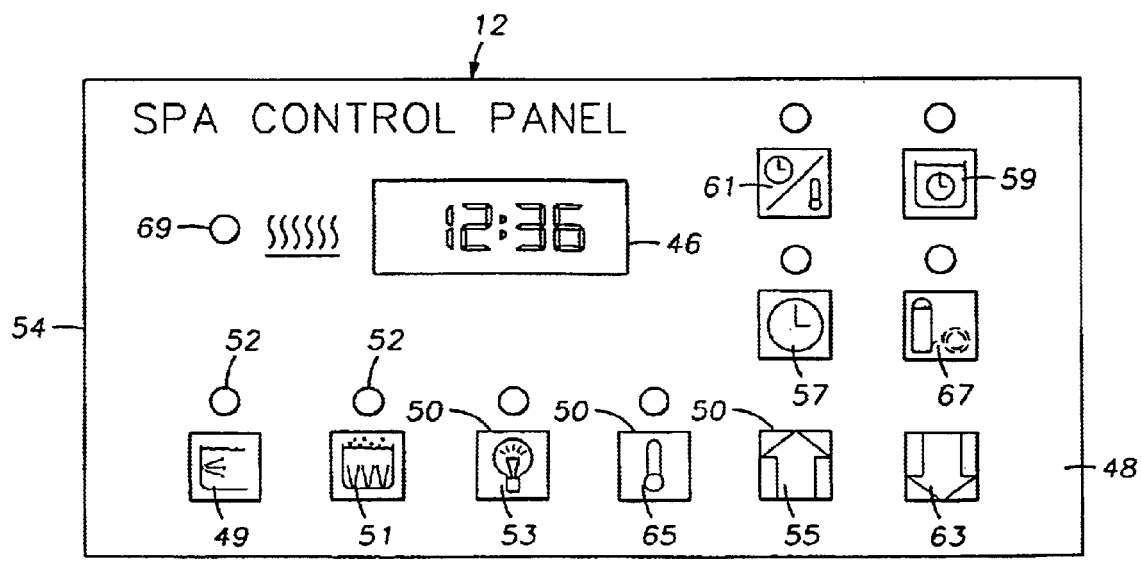
FIG. 5

SPA CONTROL SYSTEM

This application is a continuation of U.S. patent application Ser. No. 09/761,264 filed Jan. 16, 2001, pending which is a continuation of U.S. patent application Ser. No. 08/822,179 filed Mar. 20, 1997, now U.S. Pat. No. 6,253,227, which is a continuation of U.S. application Ser. No. 08/703,177 filed Aug. 23, 1996, now abandoned, which is a continuation of U.S. application Ser. No. 08/327,927 filed Oct. 24, 1994, now U.S. Pat. No. 5,559,720, which is a continuation of U.S. patent application Ser. No. 08/225,282 filed Jan. 11, 1994, now U.S. Pat. No. 5,361,215, which is a continuation of U.S. patent application Ser. No. 07/224,869 filed Jul. 26, 1988, now abandoned, which is a continuation-in-part of U.S. patent application Ser. No. 07/054,581, filed May 27, 1987, now abandoned, each of the above related applications and patents being incorporated herein by reference.

FIELD OF THE INVENTION

This invention relates to the development of a spa control system. More particularly, this invention relates to a spa control system which uses an interconnection panel and a control panel to effectively control various operating functions of the spa.

BACKGROUND OF THE INVENTION

The design of systems to control spas is complicated by the environment of the spa. Typically, spa control systems contain heating elements, controls, switches, and wiring harnesses which deteriorate when exposed to moisture or extreme levels of humidity and a hostile chemical environment. Since the chemically treated, heated water of the spa raises the humidity level and produces corrosive gases, the atmosphere surrounding the controls of the spa unit is inherently corrosive to spa control systems.

The accuracy of the temperature of the spa water is essential to the safety and comfort of the spa user. This temperature is difficult to accurately control, since the temperature of the water can vary rapidly depending on the number of spa users, the ambient temperature of the air, and other environmental factors. To conserve energy, the spa temperature is customarily raised to the desired level shortly before the expected use of the spa, and is not maintained at a constant temperature when the spa is unattended. Depending on the use of the spa, the temperature of the spa water may be cycled several times per day. During these cycles, the control of the water temperature is difficult to maintain without overheating or underheating the water. Typically, a spa control system merely heats the water with a heating element until the temperature of the water matches a predetermined setting selected by the spa user. Since the heating element is not turned off until that desired water temperature is reached, the residual heat in the heating element may increase the temperature of the water beyond the actual temperature desired. Conversely, the location of the temperature sensor may be located in the spa in such a fashion that it does not sense the actual, median water temperature. Accordingly, the heating element may be turned off before the temperature of the water reaches the desired level.

Present spa controllers operate on line voltages which can present a safety hazard to the spa users. To meet desired safety specifications, these controls are typically located away from the sap, however, this separation is inconvenient to the spa user.

SUMMARY OF THE INVENTION

The present invention overcomes the foregoing difficulties by providing a spa control system which accurately and efficiently controls the operation of the spa and is not adversely affected by the corrosive environment surrounding the spa. The spa temperature control system generally comprises a heating element, a sensor for detecting the temperature of the water, and a microcomputer for processing signals generated by said sensor and for activating and deactivating the heating element. In one embodiment of the invention, the microcomputer assesses the time necessary to heat water from an initial temperature to a selected temperature. From this information, the heating rate of the water can be calculated. The heating rate can be stored by the microcomputer and can be used to determine the start time necessary to heat the spa water from an initial temperature to a selected temperature by a desired time. In the same or another embodiment of the invention, the temperature difference between two sensors in the spa system can be monitored to detect problems in the system.

BRIEF DESCRIPTION OF THE DRAWINGS

FIG. 5 illustrates one embodiment of a display panel for the operation of the spa control system.

FIGS. 7-13 illustrate flowcharts of various software functions of the spa control system.

DESCRIPTION OF THE PREFERRED EMBODIMENTS

Figure 1:
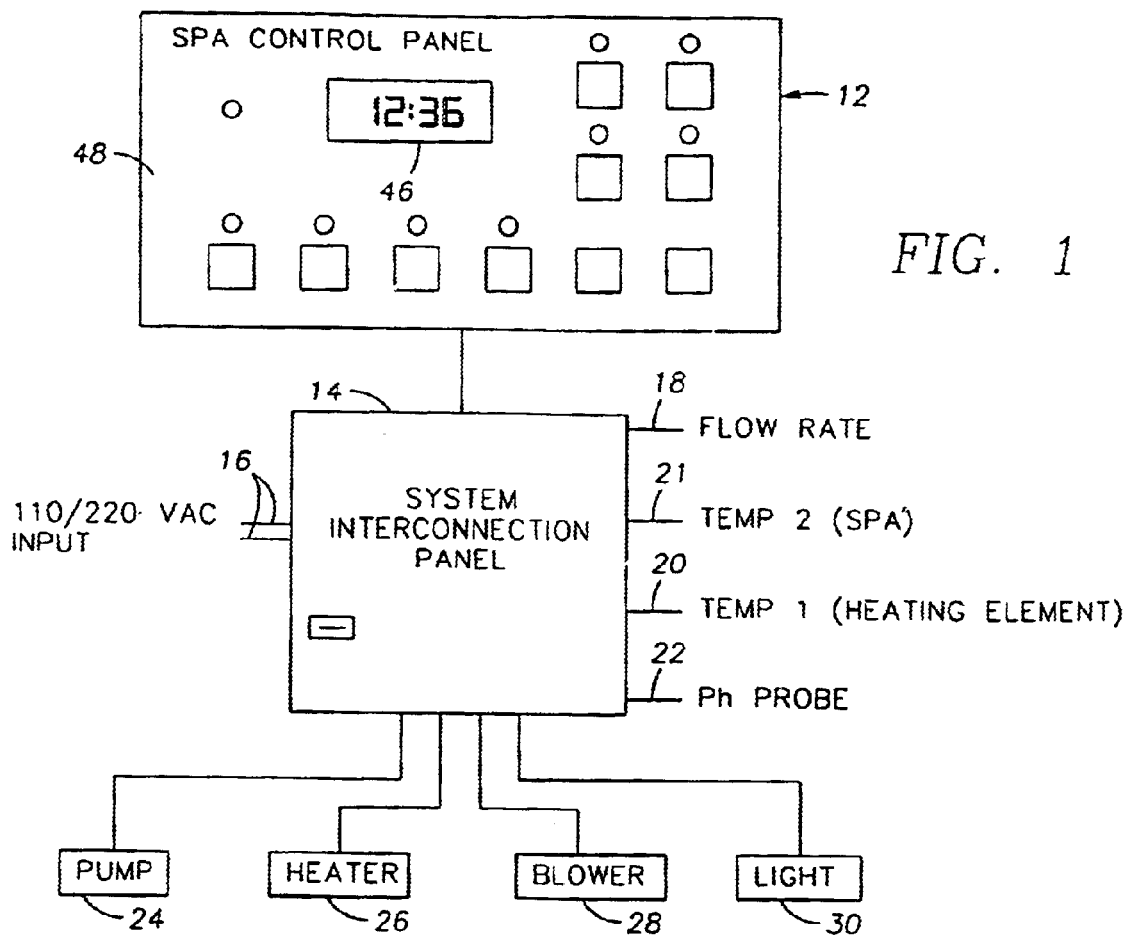
FIG. 1 illustrates a schematic block drawing of the spa control system.
Figure 2:
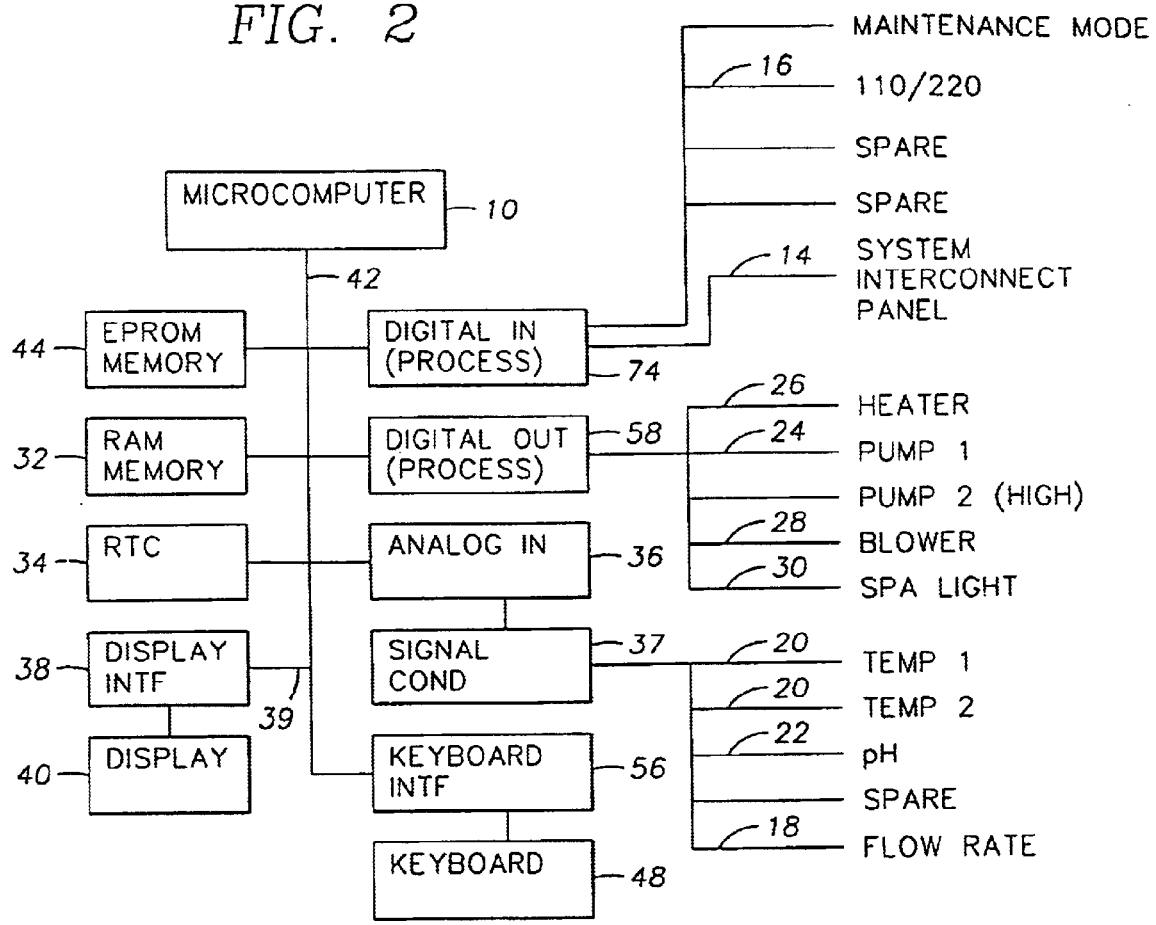
FIG. 2 illustrates a block diagram of the microcomputer and its associated components.

FIGS. 1 and 2 illustrate a block diagram of the overall spa control system. The spa control system uses an intelligent microcomputer 10 to monitor and control the operation of the spa. The system uses solid state electronic components which eliminate many of the problems associated with traditional mechanical timer and relay control systems. The use of solid state electronic components increases the reliability of the system and reduces the maintenance necessary to maintain the spa in operable condition.

Figure 14:
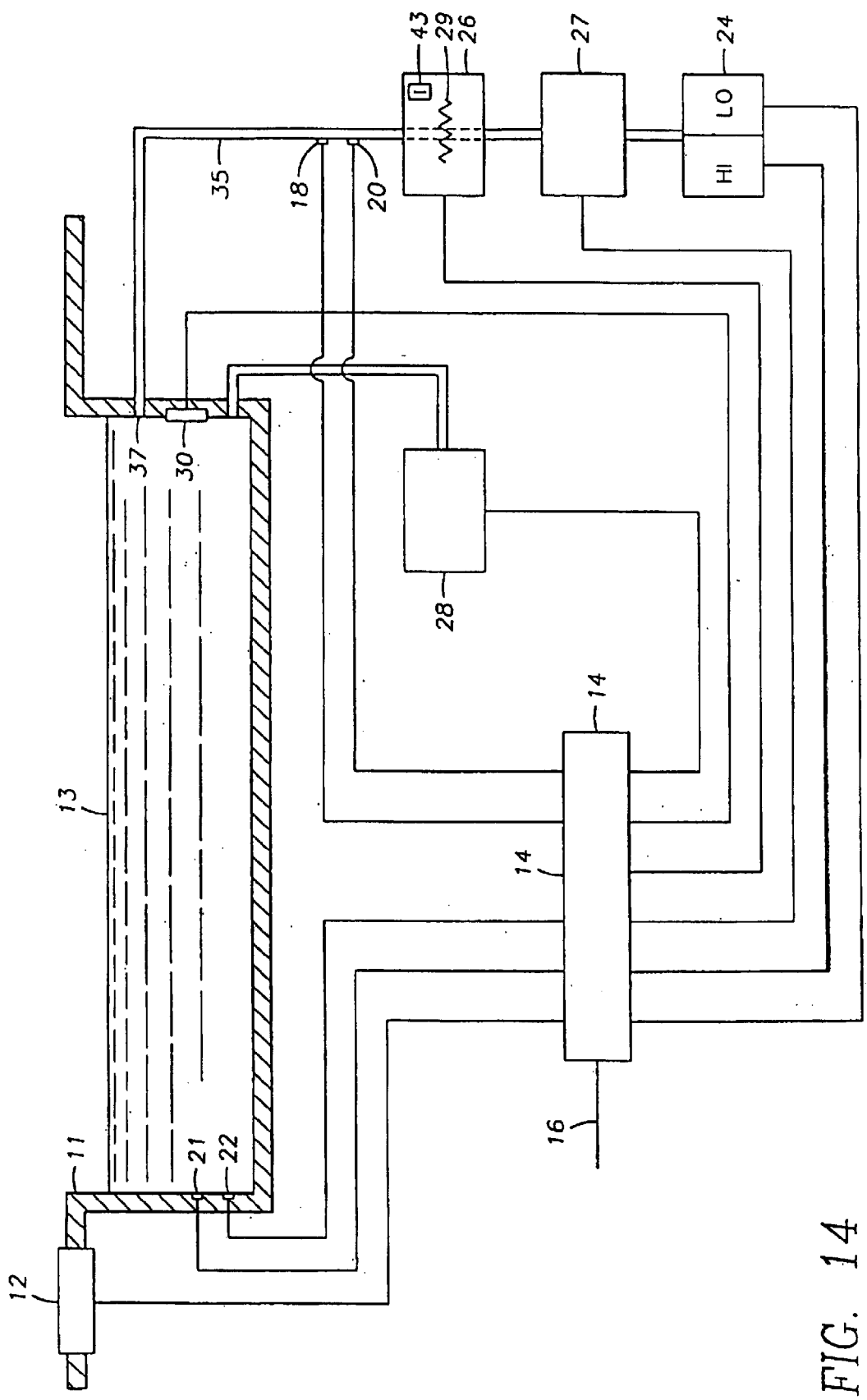
FIG. 14 illustrates diagrammatically a system constructed in accordance with the preferred embodiment.

Referring to FIGS. 1 and 14, the external system generally comprises a spa control panel 12 which is connected to a system interconnection panel 14. The system interconnection panel 14 is also connected to power input 16, to various sensors which detect parameters such as flow rate 18, temperature 20, 21 and pH 22 of the water, and also the mechanical and electrical components of the spa, such as the pump 24, heater 26, blower 28, and lights 30. The heater 26 may be interlocked to the pump 24 so that the pump 24 is continuously pumping water over the heating element 29 of the heater 26 while the heater 26 is activated. This prevents a "hot spot" from developing in the spa system which could damage the components of the spa or give erroneous measurements.

The system is a microcomputer-based system. In addition to the microcomputer 10, the system utilizes several other devices. While the control program runs on the microcomputer 10, it is directly responsible for the management of the system hardware. The following description briefly summarizes the major devices:

NOVRAM 32

This is a nonvolatile RAM device that is used to store the system calibration values as well as providing RAM expansion for the microcomputer 10. An EEROM image of the calibration values is stored when the powerfail interrupt is posted to the microcomputer 10 and restored when the microcomputer 10 powers up.

RTC 34

This is a realtime clock device that provides a clock value. It is the timebase for events that are scheduled by time of day as well as a timer for events that are measured in seconds.

A/D 36

This is an analog to digital converter that converts voltage inputs after signal conditioning at 37 to digital numeric representations. It provides three values: spa temperature 21, heater temperature 20 and pH value 22.

DISPLAY DRIVER or INTERFACE 38

This device accepts a bitstream 39 from the microcomputer and drives the display 40 for the spa control panel 12. A bit is input for each segment on the display.

FIG. 2 illustrates a block diagram of the spa control system and its associated components. The electronics in the spa control system are designed to handle temperature extremes of minus twenty to plus seventy degrees Centigrade. The technology used in this design of interface components is Complementary Metal Oxide Semiconductors (CMOS) which is low in power consumption and high in reliability. The microcomputer 10 is typically an 8-bit control device with an 8-bit data bus 42. Its function is to execute instructions, control processes, make logical decisions and compute values. The microcomputer 10 operates at a clock speed of typically two megahertz and can make thousands of calculations per second. The microcomputer 10 reads instructions from the memory, such as EPROM 44 and then executes the appropriate actions.

The Erasable Programmable Read Only Memory (EPROM) 44 stores the instructions for the microcomputer 10 to execute. Once a program is created the final software is loaded into the EPROM 44. The EPROM 44 can be modified to add new features, or additional EPROMs (not shown) can be connected to manage different functions and applications. The Random Access Memory (RAM) 32 is a memory device which stores temporary information while the information is being processed by the microcomputer 10. The RAM 32 only reads and writes data, and can hold data for future reference even after the main power 16, is turned off. The RAM 32 stores data such as the number of hours on the heater 26, the number of times that the temperature of the spa exceeds the pre-selected temperature, and other information.

The Real Time Clock (RTC) 34 shows the proper time of day which is calculated after the time and date are initially set. The microcomputer uses this information to schedule events concerning the operation of the spa, such as when the spa is turned on, when the water is circulated, and other events. The RTC 34 is backed with a battery or similar device (not shown) so that it maintains the accurate time when the main power supply is turned off.

The display interface 38 is responsible for driving and updating the display device 40. When the microcomputer 10 sends information to this block 38 it is decoded and displayed on the screen 46.

The display screen 46 is typically a vacuum-fluorescent type which has a blue-green color. The display contains four seven-segment characters, and colon. The Display Interface 38 represents circuitry which drives and updates the display device. Information from the microcomputer 10 is decoded and displayed on the screen 46 by the means of the interface 38. The data remains on the screen 46 until the microcomputer 10 sends a new message or the system is reset or powered off.

The keyboard 48 (FIGS. 1, 2 and 5) shown is a flat panel membrane style which is incorporated into the front panel. One type of keyboard 48 has ten push-buttons 50 and nine translucent cut-outs for backlighting of Light Emitting Diodes (LEDS) 52. The keyboard 48 is mounted on bezel 54 to provide a firm surface when depressing the buttons 50. The keyboard interface 56 provides circuitry which transmits information from the keyboard 48 to the microcomputer 10. The keyboard interface 56 acts as an array of on/off switches that correspond to each keypad. The microcomputer 10 scans these switches as on/off, switch type input bits.

The Digital Outputs 58 drive the external spa devices, such as the pump 24, heater 26, blower 28 and other auxiliary devices. The low voltage signals are optically isolated at 60 and then drive a TRIAC device 62 which provides the high voltage and high current required by the external devices.

Figure 3:
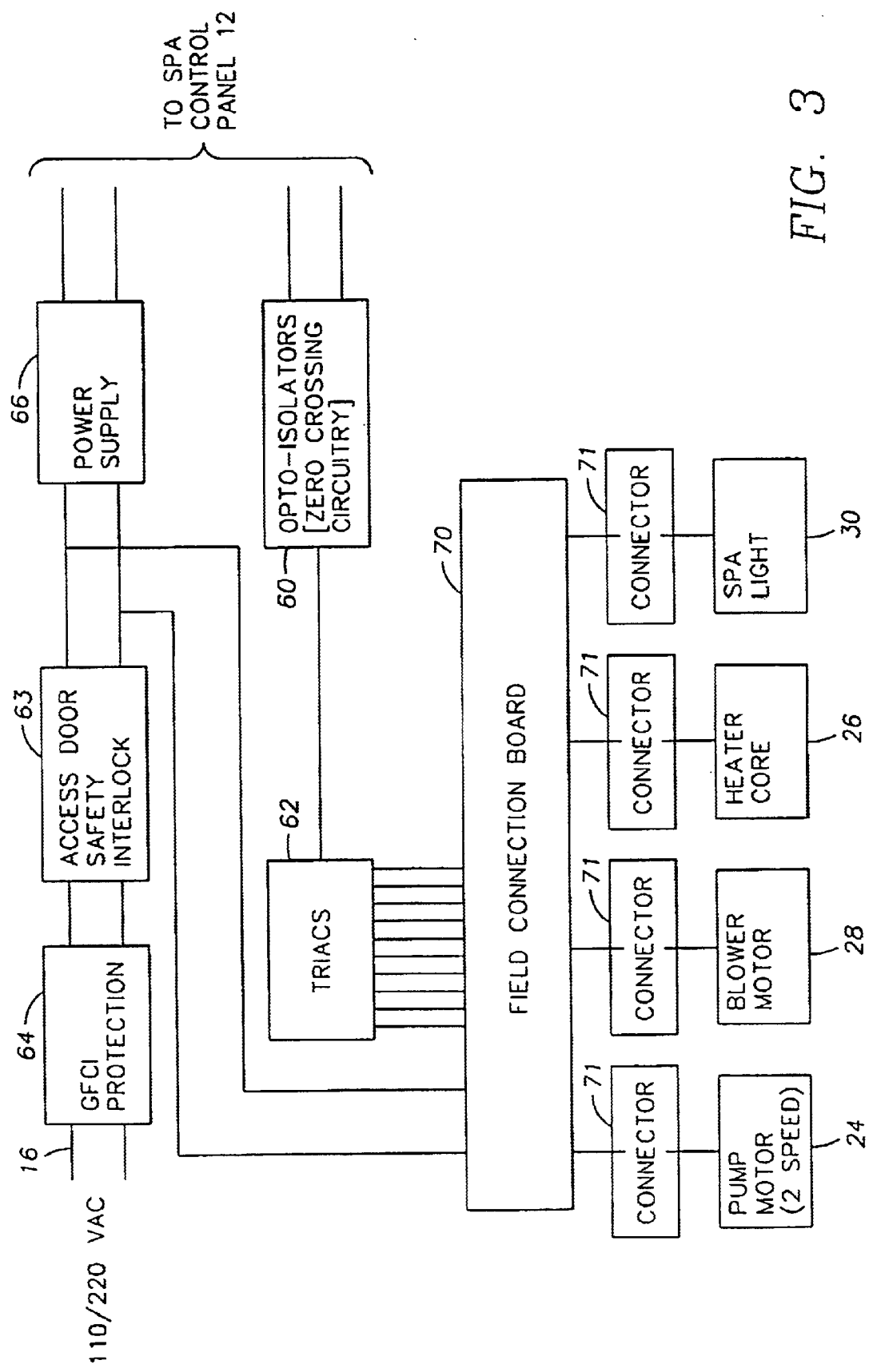
FIG. 3 illustrates a block diagram of the spa control system field interconnection panel.

As previously set forth, the system interconnection panel 14 connects the components of the spa control system. Referring to FIG. 3, the power 16 to the system interconnection panel 14 is supplied through usual power supply. The Ground Fault Current Interrupter (GFCI) 64 provides protection to the system interconnection panel 14 if an imbalance of current flow occurs through the Door Interlock 63 between the Input and the Output of the GFCI. The GFCI 64 prevents voltage and current from entering the system after the device 64 has been triggered. After the power has passed through the GFCI 64, the Power Supply 66 converts the 110 or 220 Volt AC into the low voltage and low power required by some components of the system. The power supply 66 also contains the backup battery or other device (not separately shown) used to provide power to the RTC 34 when the main power is turned off.

The Opto-Isolators 60 receive signals from the spa control panel 12 which designate the operation of the proper output device. The Opto-Isolators 60 isolate the low voltage and current control system from the high voltage and high current of the main power supply 16. These devices in conjunction with Triacs 62 also provide synchronization with the zero volts crossing of the AC power 16 to switch devices on/off when power is minimal to avoid stressing devices. Connected to the Opto-Isolators 60 are the Triacs 62, which are solid state devices used to drive high voltage and high current output devices with alternating current. Triacs 62 function as relays, except that Triacs 62 are electronic devices that do not contain any moving parts. Typically, the Triac 62 to a heating element may be rated at forty amps maximum current, and the Triacs 62 to other output devices might typically be rated at twenty-five amps. Connected to the Triacs 62 is a field connection board 70 which mechanically permits the connection and disconnection of field devices such as a pump motor 24, blower motor 28, heater core 26, or a spa light 72.

The output devices are connected to the field connection board 70 by connectors 71.

The Analog Input section 36 converts information from various sensors 20, 21, 22 into digital information so that the data can be read by the microcomputer 10. The converter 36 translates the analog information into digital information through, for example, dual slope integration which permits fast and accurate conversion. The accuracy of the A-D section 36 typically is 8 bits or a resolution of 1 out of 256. The signals from external probes and sensors 20, 22 are conditioned by amplifying, filtering, or conditioning the signals 37 so that the A-D converter 36 can make an accurate conversion. The Signal Conditioning section 37 also receives the low signals from external probes 20, 21, 22 and amplifies it to a level where the A-D converter 36 can make an accurate conversion. This section 37 also provides transient and surge protection to reduce normal and common mode rejection noise.

Figure 4:
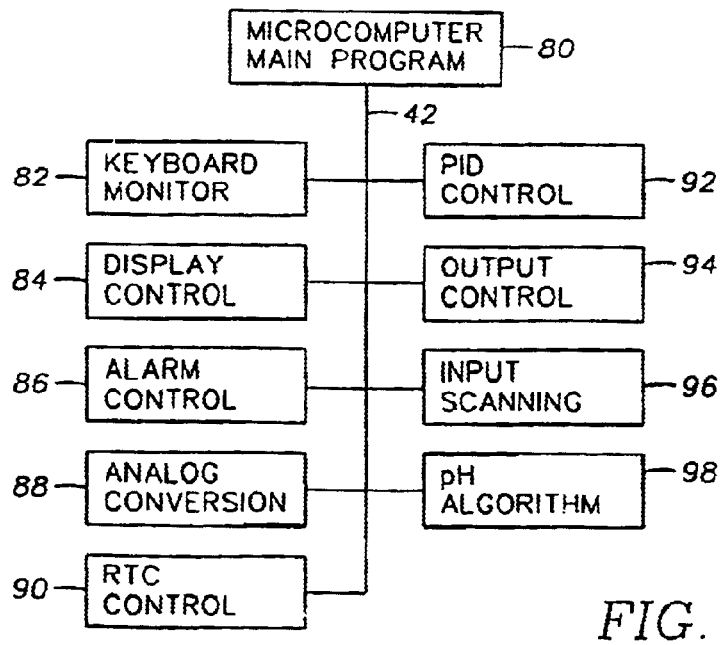
FIG. 4 illustrates a functional block diagram of the software which operates the spa control system through the microcomputer.

FIG. 4 illustrates a functional block diagram of the software which operates the microcomputer 10. The final software code is encrypted on the EPROM 44 for operating the microcomputer 10. The main program 80 schedules the operation of all other subprograms and performs general housekeeping chores, such as memory management, timer control, interrupt handling and the scheduling of tasks.

The keyboard monitor routine 82 scans the keyboard and is triggered by the operation of any key. The key signal from the digital input is then decoded, and the main program 80 is triggered to initiate a series of programmed events. The program ignores multiple key depressions and erroneous entries and operates only upon the signal generated from a proper key entry. The display control program 84 converts data from the EPROM 44 to readable messages which can be shown on the display 40. The display control 84 handles the timing of the signals so that the display 40 performs in an efficient and proper manner. The alarm control 86 monitors the proper operation of the entire spa system. If the system malfunctions or otherwise operates incorrectly as measured by the input signals or data inferred from the input signals, the alarm will signal the malfunction to the panel 12. Examples of malfunctions in the system that might occur are the malfunction of the heater 26 and whether the pH 22 levels are within an acceptable range. In the event of a malfunction, a signal will be sent to the display controller 84 to display the alert signal and to alert the spa user of the malfunction.

The Analog Conversation Program 88 manipulates the converter circuitry 36 to read and convert analog input signals from sensors to digital information. This program also converts the digital information to engineering units for the purposes of display and comparison.

The RTC control program 90 controls all interaction with the Real Time Clock 34. The program is responsible for loading data for future events.

The PID Control 92 constructions stands for proportional, integral and derivative control. This program 92 performs the closed loop control of temperature using the temperature input 20, 21 as its variable to be controlled and the heating elements 29 and the output to maintain control. The program 92 monitors the temperature 20, 21 of the water and determines when the heater 26 should be engaged. The program issues a command which activates the heater 26, and then monitors the temperature 20, 21 to determine when the heater 26 should be turned off. The program is unique in that it also monitors the rate of decrease and the rate of increase of the water temperature so that the final temperature of the water is not higher or lower than the selected temperature beyond the control supplied by derivative control. The spa control system can achieve an accuracy of plus or minus one degree Fahrenheit with the heating and monitoring elements.

The output control program 94 issues commands to the output components to turn on the Triacs 62 for control of the pump 24, heater 26, blower 28, lights 30 and other components. The input scanning program 96 monitors devices such as push buttons and switches. The pH algorithm 98 converts raw digital data received from the A-D converter 36 on the pH input 22 and converts this data to standard pH units of measure.

Figure 6:
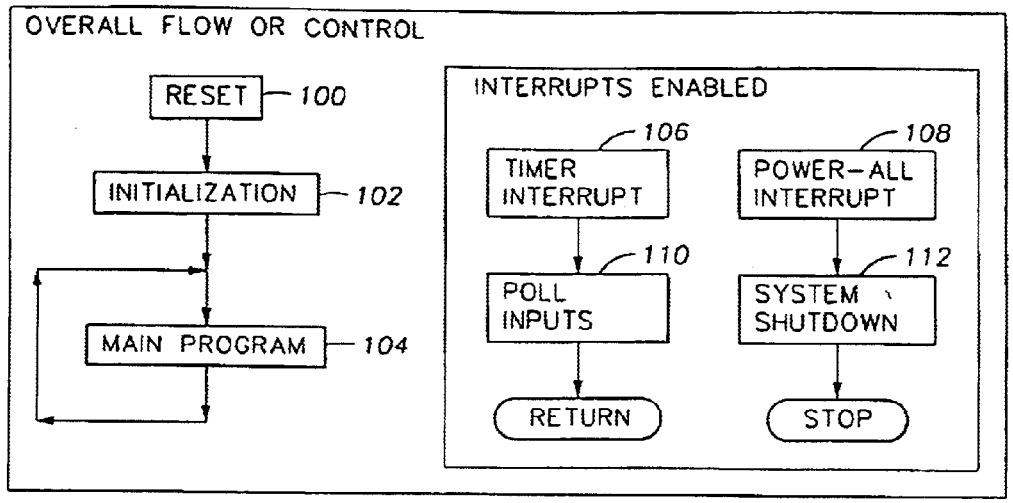
FIG. 6 illustrates the overall software control of the spa control system.

FIG. 6 provides an overview of the program organization. Three events are handled by the system. Reset occurs when the system is powered up. It performs system initialization, enables the other events, and then calls the main program. The timer interrupt occurs periodically and inputs that require periodic polling are scanned. The power fail interrupt occurs when system power is failing. The primary purpose of this handler is to save the current system operating parameters within the time remaining before power fails completely. The function of certain subroutines is in one embodiment of the system are described in detail below.

The system initialization routine is invoked by powerup reset. This routine is responsible for initialization of all devices and data structures. The tasks it performs are:

Clear all RAM

Turn off all control outputs

Digital I/O initialization

Restore NOVRAM image (to restore previous system configuration)

Clear display

Initialize the RTC. If the time was lost, it is reset to 12:00 midnight.

Initialize keyboard scanner

Test the NOVRAM image for validity. If the image is invalid, create fallback image and post warning Test EPROM (program space) memory Display 110/200 volt setting Perform RTC update test (takes a couple seconds)

Enable timer and powerfail interrupts

Jump to main program

The timer interrupt handler responds to the periodic timer interrupts. It scans I/O devices that require constant scanning for system operation and provides a higher frequency timer base that the one second resolution provided by the real time clock. The operations this handler executes are:

Save interrupted program's context

Update high speed clock value for synchronization with main program

Scan keyboard

Poll real time clock and if seconds have changed, provide one second timer update Read in one analog cannel. Provide raw input correction and calculate engineering units (temperature values are curve-fitted, and pH values are temperature corrected)

Restore interrupted program's context

Return to the interrupted program

The powerfail interrupt is furnished by a level-monitoring circuit which monitors power loss on system input power. When a decline is detected, an interrupt is posted to the microcomputer. The powerfail handler is invoked when this interrupt is posted. It is responsible for saving the current system configuration and for shutting the system down in an orderly fashion. The tasks it performs are:

Mask all interrupts

Save system configuration (this includes operating parameters as well as user settings)

Turn off all spa controls

Display "Fail"

Monitor powerfail interrupt for power restoration (brown out). If powerfail is cleared and remains cleared for approximately one second, the powerup reset handler is called.

The main program 104 performs the bulk of the operations performed by the system controller. It synchronizes with the timer interrupt so that a reasonably constant timebase be is used. A state machine is maintained to determine how keyboard inputs are to be interpreted and what is to be displayed. The following tasks are performed by the main program:

- On initial (powerup) entry, pause to allow timer interrupt handler time to build valid input values
- Synchronize with timer interrupt. While waiting for timer, drive buzzer output.
- Update the general timer used by state handlers for timeouts
- Run flasher manager
- Get current keyboard inputs
- If any keyboard inputs are available, post buzzer output request and reset the "system unattended" timer
- Handle keyboard inputs for maintenance mode entry/exit
- Call control manager keyboard input handler
- Call current state manager's keyboard handler routine
- Handle remaining function keyboard inputs to drive state changes
- Go to current state's display handler
- Call control manager to drive system controls
- Go back to the timer synchronization step (step 2)

Operator settings can be controlled by keys on the system keyboard which are used to select modes that allow the operator to change settings that control system operations. These are grouped at the right side of the keyboard. They are:

- Spa temperature
- Spa ready
- Filter maintenance
- Time of day
- Scheduled heating All of these functions adhere to a consistent operator interface scheme. When the function key is pressed, the LED 52 next to the key 50 is lit. The LED remains lit until all steps have been completed or another function has been selected. While setting a value, the value is displayed on the screen 46 and is flashed. The arrow keys are used to change the displayed value and the function key is pressed to proceed to the next step in the setting. While changes are being made, the display 40 stops flashing to avoid changes occurring while the display is in the off state. Once changes have stopped, the display resumes flashing. Changes are honored as they are made and the operator can change one step of a function without affecting the remaining steps. The current setting can be reviewed by pressing the appropriate function key repeatably. When a function that has been defined by the operator is currently being executed, the LED next to the corresponding button blinks.

The spa temperature key is used to define the temperature setpoint. This function has only one step that allows the setpoint to be changed. Pressing the set temperature key again exits the mode.

The spa ready key is used to define when the spa is to be at a particular temperature. The following example would cause the system to bring the spa temperature to 102 degrees at 6:30 p.m.

|   |   | Example |
|---|---|---|
| * | Set the hour of the ready time | 06: P |
| * | Set the minute of the ready time | 06:30 |
| * | Set the temperature to be achieved | 102 |
| * | Enable/disable this function | On |

The filter maintenance key is used to define an interval during which the low speed pump is to be run to filter the spa water. It has the following steps:

- Set the hour of the start time
- Set the minute of the start time
- Set the duration of the interval. This value changes in increments of ten minutes and can be set from zero to eight hours.

The time of day is set in two steps. First the hour is set, then the minute. Hours are displayed with an "A" or "P" for am and pm indication.

This scheduled heating function allows the user to define the hysteresis that is to be used when the spa is unattended. It also allows a "start time" to be defined. The spa will begin heating whenever the temperature drops below the low temperature setting or the time matches the start time. With an appropriate temperature envelope, this will allow the spa to heat once a day while unattended. The following steps are used to define this function:

- Set the hour of the start time
- Set the minute of the start time
- Set the high limit of the temperature envelope
- Set the low limit of the temperature envelope
- Enable/disable this function The idle mode is used when none of the operator setting functions are active. At this time, the display scrolls through a sequence of displays that display the systems current state. The time, temperature, pH and error indications may be cycled continuously.

Concerning operator controls, some fo the systems control outputs are directly controlled by the operator through alternate action inputs on the keypad. These are the light, jet and turbo keys. The control, manager's keyboard handler accepts these keyboard inputs and changes the current output values. These changes are then reflected on the LED's next to the keys. The LEDs are lit when the corresponding control is on.

Maintenance mode is a special state that is reached by turning the maintenance switch to its "on" position. When the maintenance mode is active, all controls are turned off and the functions of the keys are redefined. When none of the keys are active, "test" is displayed. When each key is pressed, its corresponding LED is lit and a value is displayed. The arrow keys alternately light all LEDs and display segments and then turn all LEDs and segments off. The following is a map of the keys and the values displayed in maintenance mode:

| SCHEDULED HEAT | pH input |
|---|---|
| SPA READY | spa temperature input |
| FILTER | heater temperature input |
| TIME | overtemp time accumulator |

-continued

| | |
|---|---|
| TEMPERATURE | heater run accumulator |
| JET | pump run accumulator |
| TURBO | turbo run accumulator |

Accumulated time values are displayed in thousands of hours. A decimal point is placed to autorange the displayed value.

System calibrations are accessed by pressing the light key while in maintenance mode. When the light key is pressed, a series of options are displayed. To select a step, or continue it, an arrow key is pressed. To get the next selection or return to the "test" display, the light key is pressed. The options available are:

CAL0 Calibrate analog channel 0 (spa temperature). This is a two point (32 and 104 degree) calibration for offset and gain correction.

CAL1 Calibrate analog channel 1 (heater temperature 20). This is identical to CAL0.

CAL2 Calibrate analog channel 2 (pH input). This is a one point (0 volts) calibration for offset correction.

CPU Display cpu RAM contents.

nov Display NOVRAM contents.

rvx.y The software revision is "x.y"

The following describes the modules that make up the system controller and further describes the algorithms they contain:

The module anlgin-routine anlgin routine controls the input of a specified analog input channel. The operations it performs are:

output channel number read input value

The module BCDNEG routine is called to negate a BCD value.

The module BINBCD routine is called to convert a binary value to a BCD value.

The buzzkey routine is called to determine if the key closure should result in the buzzer beeping. "Positive" key values result in the buzzer flag being set for "buzzer".

The buzzer routine is called to drive the buzzer if a key was pressed. The buzzer interval is decremented until it is zero and the buzzer stops.

The buzzoff routine is called to cancel the keyboard buzzer output in special cases when the state handler wishes to block certain keys from being acknowledged.

The KBCAL0 routine is called to handle keyboard inputs while displaying "CAL0". It allows the user to move on to CAL1 or to select to calibrate analog channel 0.

The KBCAL1 routine is called to handle keyboard inputs while displaying "CAL1". It allows the user to move on to CAL2 or to select to calibrate analog channel 1.

The DSPCAL0, DSPCAL1, DSPCPH routines display the "CALn" message.

The KBCLOW routine handles keyboard inputs while scanning the low (32 degree) value during calibration or channels 0 and 1. The user can select to abort or continue. If the choice is to continue and the raw input value is in the range 1 . . . 31, then the value is accepted and calibration continues to the high step. Otherwise, the low error state is entered.

The DSPCLOW routine is called to display the raw value while waiting for the low (32 degree) input value. It builds a display of the form "Ln:xx" where n is 0 or 1 and xx is the ra input value.

The KBCLERR routine is called when the calibration is in the low error state. It allows the user to choose to abort or retry the input of the calibration value.

The DSPCLERR routine is called to display the low calibration error message of the form "Lx:Er" where x is 0 or 1.

The KBCHI routine is called to handle keyboard inputs while the temperature calibration is in the high (104 degree) input state. It allows the user to abort or accept the current setting. If the current setting is in the range 163 . . . 195, the value is accepted. In conjunction with the previously obtained low value, a pair of values, m and b, are calculated such that the raw value r, m*r+b will result in a corrected value at the two calibration points. These two values are stored in NOVRAM and used from this point onward in temperature calculations for this channel. The system then proceeds to the "done" state. If the input value is not in the correct range, the system proceeds to the high error state.

The DSPCHI routine is called to display the raw input while in the high (104 degree) calibration step. It builds a message of the form "Hn:xx" where n is 0 or 1 and xx is the raw value.

The KBCHERR routine is called when the calibration is in the high error state. It handles the keyboard input and allows the user to abort the sequence or return to the high value input sate.

The DSPCHERR routine is called to display the message "Hn:Er" when the high calibration step is in error. "n" is either 0 or 1.

The KBCDONE routine is called to handle keyboard inputs when the calibration is complete. It allows the user to return to the idle maintenance mode state. It acts to hold the "done" message until the user acknowledges it.

The DSPCDONE routine is called when the calibration has reached a successful conclusion. It displays the message "done".

GETRAW is a routine local to the calibration module to fetch the appropriate raw input from the raw input table.

The KBCPH routine is called when "CAL2" is displayed. It allows the user to choose to move to the next item in the "light" menu or to calibrate the pH input.

The KBCPHI routine is called to handle keyboard inputs when calibrating the pH input. It allows the user to abort the operation, or to accept the current input. If the current input has an error of less than 32, the offset is stored and the calibration goes to the "done" state. If the error is too large, the system goes into the pH error state.

The DSPCPI routine is called to display the current raw pH input during pH calibration. It forms a message of the form "PH:xx" where xx is the current raw input.

The KBCPHE routine is called to handle keyboard inputs when the pH calibration value has too large an error. It allows the user to abort the operation or to retry the calibration.

The DSPCPE routine is called to display the error message "PH:Er" when the calibration value has too large of an error.

The module control-routine CTLPOLL routine is called by the main program to perform the actual output controls. The following tasks are performed:

Set Ready—if the set ready function is enabled, this section decides if the set ready function is to perform any actions. If the current time matches the ready time, the set ready temperature is copied to the spa temperature setpoint, the spa is marked "attended" and the set ready function is disabled to prevent further actions.

For the Set Ready, as well as for Normal Temperature Control discussed infra, the time required to get from the current temperature to the desired temperature is calculated and with a fifteen minute hysteresis, the decision is made whether to turn the function on, or to turn it off. If the function is to be on, a request is posted to the heater to run.

System Attended—system attendance is checked and if the system is unattended, the high speed jet and the turbo controls are turned off. The system is marked attended if the key has been pressed within the last 30 minutes.

Scheduled Heating—if the scheduled heating function is enabled, this section decides if this feature should perform any actions. If the system is attended, control is passed to the next section, normal setpoint control. If the function is off, the temperature is compared to the low setting and the time is compared to the time setting. If appropriate, the function is requested, but control is still passed to the "on" section to allow it to override the time startup. If the function is on, the temperature is compared to the high setting and turned off if the setting has been reached. The next section, normal setpoint control, is then skipped.

Normal Temperature Control—this function is executed if the system is attended or if the scheduled heating function is not enabled. It compares the current temperature to the temperature setpoint to see if the heater should be given a request to be on or off from this function.

Heater/Pump Interlocks—this section handles pump/ heater interlocks. It requires that the pump runs fifteen seconds before the heater actually runs. It also guarantees that the pump runs sixty seconds after the heater is turned off. It also interposes at the delay lockout to prevent on/off cycling due to fluctuations in control requests.

110V Interlocks—units operating on 110 v have limitations on how much power can be used at any given moment. The system charges 110/220 algorithm automatically at power-up. This section also checks the current 110v/220 flag and posts a heater shutdown request if this is a 110 v unit and either the jet or turbo are on.

Pump Speed Interlock—this section handles the timing of transfers between high and low speed pump operation. A delay of three timer interrupts is interposed between the two speeds to prevent the possibility of on/off switching on cycle boundaries causing both outputs being on simultaneously.

Low Speed on Requests—the low speed pump requests for heater and heater cooling, as well as the filter interval are handled in this section. If a heater request is on, then a low speed pump request is posted. If the heater cooldown interval is active, a pump request is posted. If the current time is within the filter interval, a pump on request is posted. Control then passes to the control error handler (CTLERR).

The Module CTLACT routine performs the following tasks:

Maintenance/Error Handling—if the system is in maintenance mode, the light, turbo and jet outputs are shut off. If the system has detected a serious system error (error 1 . . . 8), the turbo and jet outputs are shut off. In either case, the heater is shut down.

Pump Actuation—if any pump requests are posted and no shutdowns are requested, the pump is turned on.

Heater Actuation—if any heater requests are posted and no shutdowns are requested, the heater is turned on. Control then passes to the control LED handler.

The Module CTLERR routine posts two errors and two warnings. The errors it checks for are frozen water and mismatch in temperature readings (flow error). The warnings it checks for are the water being too hot for safe usage and the pH reading out of safe limits.

The Module CTLKEY routine handles directly output keyboard inputs. In particular, it controls the light, jet and turbo. If the system is maintenance mode, no keys are processed. If the system is in an error state only the light key is processed. The controls are complemented each time the corresponding key is pressed.

If the module CTLLEDS-routine operates while the system is in maintenance mode, and the LED drive is disabled, the light, turbo and jet LEDS re driven solely on the output states. The heater LED is driven steadily if the heater is on and flashed if the heater is off and has a request posted. The filter, set ready, scheduled heat and temperature LEDS are flashed if the corresponding function is posting a request and if the operator is not in a state used to set the function. If the operator is setting the function, the LED is already on and is not flashed.

The Module Delay routine provides a software waitloop style of delay routine used mainly during powerup.

The Module ADELTIME DELTIME routines are used to determine the interval between the current time and the specified time. DELTIME determines the time that has elapsed since the specified time while ADELTIME determines the time that remains until the specified time arrives.

The Display module contains routines that convert values into displayable messages and a routine that actually writes the messages to the display. Many of the routines have two entry points, DSPxxx and BFRxxx. The DSP version uses the standard buffer while the BFR version uses a user-specified buffer. The DSP version only will be described to avoid repetitive descriptions of the BFR versions.

The DSPULZ routine is called to remove leading zeros from numeric messages.

The DSPBCD routine is called to convert from a BCD value to a display image.

The DSPOUT routine sends the message image to the display.

The DSPTIM routine converts a time value into a message.

The DSPTMP routine converts a temperature value into a message.

The DSPERR routine converts an error number into an error message.

The DSPPH routine converts a pH value into a message image.

The EXTRAM module contains routines to support the NOVRAM image of the system configuration.

The NVSUM routine is used to calculate the checksum value. It is used by the other routines to handle the checksummed configuration record.

The NVUPDT routine is called whenever a change is made to the configuration. It updates the checksum value. Powerfail interrupts are masked until the new checksum has been completed.

The ERTEST routine is called at powerup time to verify the system configuration. If the image is corrupted, it is reset to reasonable fallback values.

The Filter module contains routines that allow the user to set the filter maintenance interval. It has already been described in the operator settings sections.

The Flash module contains routines that support a consistent 2 hertz flash of LEDS, display, etc.

The Flashdrive routine is called to drive the timebase for the flasher. It is called once per timer interrupt synch by the main program.

The Flash routine returns a on/off flag to allow callers to determine if they should be setting or clearing their outputs to flash.

The Float module contains several routines that provide operations on scaled integer values.

The FPADD routine adds two scaled integer values.

The FPMULT routine multiplies two scaled integer values.

The FPRND routine rounds a floating point number to the nearest integer value.

The Idle module contains routines that handle keyboard inputs and drive the display while the operator is not programming any of the system's features. The display is stepped through the current time, temperature, pH value (if installed) and errors (if any are present).

The KBIDLE routine handles keyboard inputs. If either of the arrow keys are pressed, the resettable errors are cleared. This is an operator acknowledgment of current alarms.

The GO SHOTOD routine is called as an entry state handler for the idle mode. It sets up to display the time and switches to the time of day state.

The SHOTOD routine is called to display the current time of day. The refresh flag is ignored. When the timer expires, the state is switched to show temperature.

The SHOTEMP routine is called to display the current spa temperature. The refresh flag is used to avoid flickering values when the current input is straddling values. When the timer expires, the show pH state is invoked.

The SHOPH routine is called to display the pH value. If no pH probe is installed, control is passed to the error displayer. Like the temperature display, the refresh flag is used to avoid flickering displays. When the timer expires, the error display state is called.

The ERRIDLE routine is called to display the errors. If no errors remain, the display time state is entered. If another error exists to be displayed, the value is displayed and the timer is restarted.

The Keyboard module contains routines that support the keyboard inputs. Keyboard inputs are signaled when the key is pressed. Key inputs are represented by an array of bits that are set when a positive transition has been detected. Three keys (up, down and maintenance) provide bits that correspond to the release of the keys. The up and down keys provide for an autorepeat that starts after a half a second and repeat at a frequency of approximately three hertz. Key transitions in both directions (on and off) are debounced.

The KBINT routine is called to initialize the keyboard image. It sets up the image such that keys that are pressed while the system powers up are ignored. Thus, a jammed key will not activate its corresponding function when the system started.

The KBSCAN routine is called periodically by the timer interrupt handler to scan the keyboard inputs and update the keyboard input image. Transitions are accumulated until they are cleared by a separate routine. Rollover is handled as additive keys. Simultaneous keys are allowed and are handled by the individual state handlers individually as prioritized keyboard inputs. This routine provides all debouncing and autorepeat functions.

The KBGET routine is called by the main program to poll for keyboard inputs. Only transitions are reported. Any key inputs are cleared and reported to the caller.

The KBAUTO routine is called to see if either of the arrow keys are being held down to generate autorepeat inputs. The result of this function is used to determine if the screen should be flashed. If repeat keys are active, flashing is inhibited.

The Module Learn routine is called as part of the control manager. If the heater is heating, the temperature value is monitored. If the temperature raises through two successive degree transitions, the time that elapsed between those two events is examined. If the time is less than one minute or two hours elapse before the event, a rate of change alarm is posted. Otherwise, the heating rate is stored for use in the spa ready function.

The LEDS module contains routines that support the drive of the LEDs mounted inside the keypad.

The LEDS routine is called to define the output state. All LEDs are redefined by this routine. They are lit or extinguished depending on the state of a corresponding bit.

The LEDCLR routine is called to turn LEDs off. LEDs that have their corresponding bit set are turned on. Those whose bits are 0 are not affected.

The MAINT module controlling the maintenance mode has previously been described. It is implemented as two routines KBMAINT and DSPMAINT to handle keyboard inputs and display output respectively. While the main module views maintenance mode as one state, the maintenance mode is actually implemented as a set of substates in a manner identical to the state scheme used in the main module.

The Module MYREGS routine is called to determine the address of the current context's register set. The address of R0 is returned in the accumulator. This routine is used when the registers are going to be used as general memory locations for subroutine parameters.

The NOVRAM module contains routines which handle the special requirements of the NOVRAM.

The NOVREAD routine is called to restore the nonvolatile image of the NOVRAM. It is called at powerup. It begins the restore function and handles the proper delay interval to the NOVRAM to complete the refresh.

The NOVWRITE routine is called by the powerfail interrupt handler to signal the storage of the system configuration image to the nonvolatile image of the NOVRAM. It guarantees that the cycle is completed and returns to the powerfail handler.

The Module POWRFAIL routine is the powerfail interrupt handler and has previously been described.

The Revision module provides for the display of the software revision and/or version. It will display different values for variants of the system software to distinguish between them. Once the system has been completed, it will be sealed, so this will provide a surefire way of verifying the software contents.

The KBREV routine handles keyboard inputs while the revision is being displayed. It allows the user to step forward past this function since this function does nothing other than display the revision value.

The DSPREV routine is called to display the revision. The revision message is a constant message.

The Module ROMTEST routine is called at powerup to check the program EPROM or other ROM. It executes a simple data line test and reports failure if any errors are detected.

The Module RTC routine contains routines that support the real time clock device.

The RTCINIT routine is called at powerup to initialize the RTC and to verify that the time value makes sense. If it does, it is assumed to be correct. Otherwise, it is assumed that the time value was lost and the time is reset to twelve o-clock midnight.

The RTCPOL routine is called by the timer interrupt to poll the RTC for updates. If any changes have occurred, the new time is stored in RAM for use elsewhere in the system and a signal is returned that it is time to handle the one second update. If any changes have been posted, the new value is written.

The GETTOD routine is called by the system at large to fetch the current time of day.

The PUTTOD routine is called by the system at large to post a new time of day. On the next poll with a second update, the new value will be written to the RTC by the routine RTCPOL above.

The SCHEAT module contains the routines that allow the user to configure the scheduled heating function. This allows the user to redefine the heating hysteresis when the spa is unattended. The minimal hysteresis value allowed is five degrees. The behavior of these routines has already been described.

The SETREADY module contains routines that allow the user to configure the set spa ready function. The behavior of these routines has previously been described.

The SHOWMEM module allows the user to display the contents of both classes of RAM. It is available only in maintenance mode.

The KBCPU routine handles keyboard inputs and allows the user to select the display of CPU RAM contents or continue to the next operation.

The DSPCPU routine displays the message "CPU: to indicate what operation can be selected.

The KBCSH routine handles keyboard input while displaying CPU RAM. It allows the user to raise or lower the current location or exit this function.

The DSPCSH routine displays the current CPU RAM address as well as the contents.

The KBNRAM, DSPNRAM, KBNRSH, DSPNRSH routines are identical to the CPU RAM routines above except that they operate on the NOVRAM contents.

The Module Start-Reset routine handles the powerup reset. Its function has previously been described.

The TEMPSET module allows the user to set the desired spa temperature setpoint. This setpoint may be overridden by the scheduled heating function if it is enabled and the spa becomes unattended. The operation of this function has previously been described.

The TICK module contains routines that support slow realtime timers (in the order of seconds).

The TICK routine is called when the RTC has updated its second. It updates several operating timers as well as the runtime timers used to measure usage intervals for maintenance purposes The GETTMR routine is called to get the current value for an operating countdown timer.

The PUTTMR routine is called to reset the current value for an operating countdown timer.

The Module TIMEBIN routine is called to convert from BCD hours/minutes to a binary value in minutes.

The Module Timer-Routine is the timer interrupt handler. Its behavior has previously been described.

The TIMESET module contains routines that allow the user to set the current time of day. Their function has already been described.

The Module UNMIL routine converts from military twenty-four hour format (used internally) to twelve hour am/pm format (preferred by most users).

The VECTORS module contains vectors that provide for the transfer among the two pairs of program segments. The thirteenth address line (A12) is manipulated as an output line in paired vector handlers to handoff control of the processor from on pair of the program segments to the other. The reset and interrupt vectors are also represented twice in this module to provide for interrupt handling from either pair of segments. This segment organization explains the discrepancies in how a particular subroutine is called from different modules. The difference is usually the fact that the two callers reside in different segments.

It will be understood that these routines describe one embodiment of the system and can be modified without departing from the scope of the inventive concepts herein taught.

FIG. 14 shows one possible configuration of the system of the present invention based on the above description. A spa, in accordance with the normal convention, includes a container 11 for holding water 13 for bathers. The control panel 12 may be at spa side. As has been previously described, various output devices are installed in the system for the user of the system. As is well known in the art, conventional output devices include a heater 26, an air blower 28, a filter 27, lights 30, and a pump 24. Pump 24 may be separate pumps or one pump with a high and low speed. Heater 26 includes a heating element or heater core 29 for heating the water. Plumbing is provided with the system such as a plurality of pipes 35 for flowing water to and from the container 11. The low speed of pump 24 pumps water through pipes 35 causing the water to pass through filter 27 and heater 26 prior to flowing into container 11. The high speed of pump 24 flows water at high speeds through jet 37 mounted on container 11. The turbo or air blower 28 blows air into the water 13.

Various input devices are installed at selected locations within the system of the system invention and include sensors for detecting various parameters of the water and the system. Such sensors include the flow rate sensor 18, the temperature sensor 20 measuring the temperature of the water at the heating element 29, the temperature sensor 21 measuring the temperature of the water in the container 11, and a pH probe 22 measuring the pH of the water in th container 11. As has been previously described, the input devices are connected to a system interconnection panel 14 which is connected to the control panel 12 and microprocessor 10 for receiving output signals from the various input devices. The system interconnection panel 14 is also connected to the various output devices for sending input signals to th vaious output devices.

FIG. 5 shows one possible configuration of the keyboard 48 for the spa control panel 12. The overlay on the spa control panel 12 contains lights and a series of push button switches which can be depressed to switch on the appropriate functions. Preferably, an audible tone alerts the user that the computer 10 has received the signal sent by depressing the key. The jet button 49 operates the high speed pump 24 for the jet action in the spa. After the jet button 49 is depressed, the system will shut off the pump 24 if there is no flow in the system after five minutes of operation. The user is notified of the malfunction by an error message shown on the display. In a preferred embodiment, the low speed pump automatically is operated when the heater is activated. By pressing the jet button 49, the high speed overrides the low speed pump in pump 49. The heater 26 is still operable but the heating efficiency decreases because the water is moving faster over the heating element. Interlocks link the pump 24 to the heater 26 so that the pump 24 runs fifteen seconds before the heater 26 is turned on and runs sixty seconds after the heater 26 is turned off. This ensures fluid flow during operation of the heater 26 so that hot spots in the system are not allowed to accumulate.

The air button 51 operates the blower motor (not shown) for the bubbling action in the spa (same interlock as jet/heater). The light button 53 operates any lights installed in the spa. The up arrow button 55 and down arrow button 63 are used in conjunction with the set clock 57, set temperature 65, set ready 61, scheduled heating 59, and filter 67 buttons. The purpose of the up arrow button 55 is to increment data that is presented on the display 40. The down arrow button 63 is used in conjunction with these same buttons to decrement data that is presented on the display. The set clock button 57 is used to set the current time of day and is activiated by pushing the set clock button 57. The desired time can then be set by activating the up arrow button 55 or the down arrow button 63. The set temperature button 65 can be used to control the temperature value for the thermostat 43 in the heater 26. To set the temperature, the set temperature button 65 is depressed and the current setting for the thermostat will be shown on the display. The up arrow button 55 or the down arrow button 63 can be used to increase or decrease the temperature setting as desired. When the desired value is shown on the display 40, the set temperature button 65 is depressed and the system will revert to the normal scroll in display. The ranges on the temperature setting may range from 40 to 104 degrees Fahrenheit.

Referring to FIGS. 4 and 6, when the system is powered up, the system is reset 104 by system initialization 102 which enables certain events and parameters and then calls the main program 110. Certain interrupts such as the timer interrupt 106 and the power fail interrupt 108 are enabled to detect future interrupts which can then be polled 100 or effect a system shutdown 112. The powerup reset 100 also generally clears all RAM 32, turns off control outputs for devices 24, 26, 28, 30, initializes the real time clock 34 reading and the keyboard scanner 82, tests the NOVRAM image for validity, and tests EPROM memory 44 (See FIG. 2).

On power-up sequence, the AC line input is read and the system electronics make a determination on whether the power is 110 v or 220 v. This status is read through a digital input by microcomputer 10 and an associated flag is set in RAM indicating which power supply is connected to the controller. On 100 v, the following constraints are imposed by the software:

Heater and low speed pump will be turned off if either the high speed pump (jets) or the blower is turned on.

The heater LED will flash during this time indicating it is tryign to heat but has been overridden.

Figure 8:
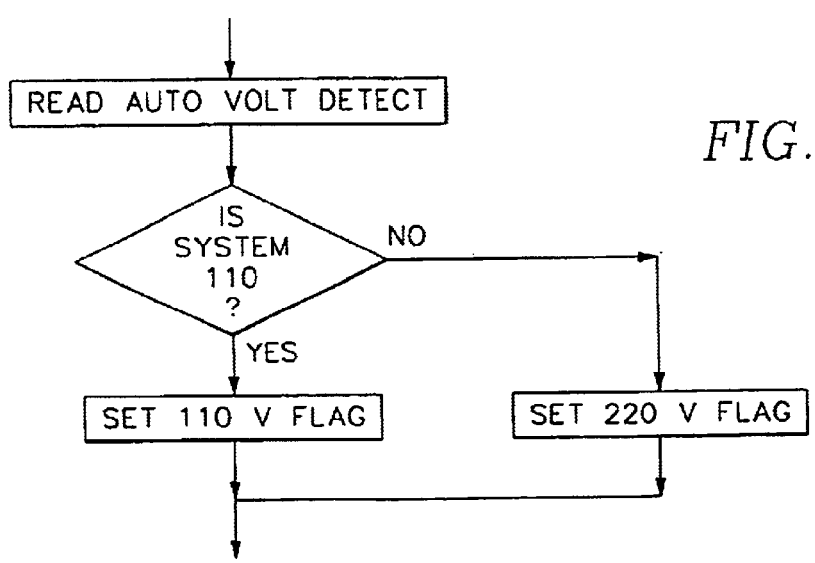

On 220 v systems, no constraints are applied. The operation of this function is illustrated in FIG. 8.

The set ready button is used to preset the time and temperature that is desired by the user.

The microcomputer 10 calculates the proper time to initiate heating based on the present initial temperature of the water, and the stored data on the rate of heating for the particular spa. Each time that the spa is heated, the microcomputer 10 monitors the rate of change in the water temperature and stores this information in the internal memory. This data is then used to calculate the time necessary to heat the spa water from the initial temperature to the selected temperature.

To operate the set ready, or spa ready mode, the set ready button 61 is depressed and the set ready light and the hours light digits on display 40 are illuminated. The hours are set by using the up button 55 and down button 63 arrows. When the hours are correct, the set ready button 61 is depressed and the minutes digits will flash. The minutes data are set by using the up button 55 and the down button 63 arrows. When the minutes data is correct, the set ready button 61 is depressed and the current thermostat setting is displayed. The up button 55 or down button 63 arrow is pressed to select the proper temperature. The set ready button 61 is then depressed again and "on" or "off" will flash on the display screen 40. This indicates whether the feature is enabled or not. The set ready button 50 is again depressed and the data is entered. When it is time to begin the heating cycle, the system program LED on display 46 will flash to indicate that the feature is active.

When the spa is heated to the proper temperature, the programmed thermostat setting becomes the current thermostat setting and the system will continue normal operation.

If enough time is not allocated for the spa to reach the desired temperature, and time runs out before the heating process is normally completed, the programmed thermostat setting will become the current thermostat setting and the system will continue normal operation.

The filtering button 67 allows the user to select the time for circulating the water in the spa for normal maintenance. To operate, the filter button 67 is depressed and the hours digits and the filter light will be eliminated. The up button 55 or the down button 63 is operated to select the hour, and the filter button 67 is depressed to set the new running time. The data is loaded into memory, the light next to filter button 67 will turn off and the display 40 will return to the normal scroll in operation. When the filter functions are active, the LED will flash.

The use of the system is checked by determining whether any operator keys have been actuated within 30 minutes, or other selected interval, of the initial start time. If not the high speed jet and turbo controls are turned off to conserve energy.

The heating light 69 is illuminated when the heating element of heater 26 is being activated. If the heating element is activated and the temperature of the water is not increase, then an error message will be displayed. The LED will flash when the heater 26 is in a warm-up or cool-down cycle.

The system may be diagnosed by operating a switch in the system interconnection panel 14 to place the keyboard 48 and display 40 in the diagnostics mode. By pressing the jet button 49, the total number of hours of operation on the pump 24 will be displayed. Pressing the air button 51 will show the total hours of operation on the blower motor. Pressing the set temp button 59 will display the total hours of operation on the heater 26 and will eliminate the set temp light. Pressing the set clock button 57 will display the total hours the system exceeded the desired temperature, designated as greater than 104 degrees Fahrenheit in the preferred embodiment. The light associated with the set clock button 57 will be eliminated after any other button is pressed. Pressing the up arrow button 55 or the down arrow button 63 will eliamiante other modes and turn on all lights on the panel 54 and will turn on all segments of the display 40 along with the colon. The normal operation of the system is disabled when the maintenance switch is on. For example, the lights, turbo and jet outputs, and heater are shut down when the system is in maintenance mode.

The system may display error codes which show potential problems within the system. Typical error codes which may be displayed might include information showing that the heater 26 was not heating, the pump 24 was not operating, there was insufficient time to heat the spa to the desired temperature, there was no water flow in the system, or there was failure in the microcomputer 10. Sensors (not shown) can be located at select locations in the system. From these sensors, the system can check for frozen water in the system and can determine whether the pH reading of the system is outside of a desired range. The system provides two functions regarding freezing of the water in the system. First, if either temperature sensor reads a temperature of thirty-four degrees or lower, the spa is considered frozen and all operations are disabled. The heater, the pumps and the blower are disabled to avoid damage to the mechanisms. Second, if the heater temperature drops below thirty-eight degrees, an impending freeze is signaled. The reaction to this condition is to run the low speed pump for five minutes. If the condition has not improved, the heater is started. Every five minutes thereafter, the temperature is rechecked. If the condition clears (the temperature rises above forty degrees), operations return to normal. This feature operates in addition to and in parallel with other operating modes.

This feature addresses the common problem of a spa being cooled by exterior cooler temperatures. The pipes and heater ten to cool faster since there is a small mass of water being cooled. If the pipes are allowed to freeze, they may be damaged or the moving mechanisms such as the pump or blower may be damaged when they are activated.

Figure 7:
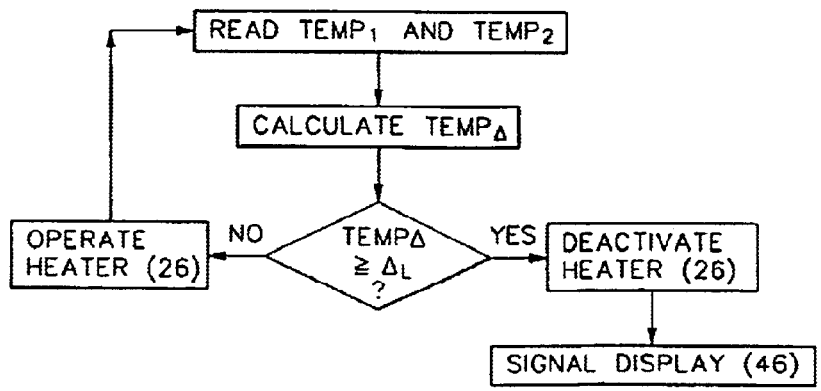

In another embodiment of the invention, the system can monitor the temperature of the water at different locations in the system to determine whether there is blockage in the system. The spa system accomplishes this by monitoring the temperatures detected by sensors located at selected locations in the spa control system. In one embodiment of the invention, a first sensor such as temperature sensor 20, which can be a solid state sensor, is located upstream of the heating element at a selected location and a second sensor such as temperature sensor 21 is located downstream of the heating element. As water flows over the heating element of heater 26, the sensors detect the temperature of the water at the selected locations. The microcomputer 10 processes the signals generated by the sensors and calculates the difference in temperature between the values detected by the sensors. The microprocessor selectively activates and deactivates the heating element of heater 26 to control the rate of heating. If the difference exceeds a selected amount, a warning on digital display 46, or other warning such as an audible sound, can be generated to warn the user of a malfunction in the spa. This function of the invention is shown in FIG. 7.

In one embodiment of the system, two temperature probes are monitored constantly for temperature differences whenever the pump is in operation. When the pump is started, five minutes are allowed for the two readings to get within six degrees Fahrenheit of one another. If the probes fail to match after this period, all spa operations cease and an error message is displayed to the user. If the heater temperature is more than six degrees higher than the spa temperature, the heater is not turned on. If the heater temperature is more than six degrees colder than the spa temperature and the heater function is signaled to be on by other portions of the control program, the heater is turned on even though the temperatures do not match. If at any time after the first five minutes the difference between the two temperature readings exceeds six degrees, all spa operations are disabled and an error message is displayed to the user.

As previously noted, this embodiment determines whether flow is present in the spa plumbing. If a blockage exists, it will result in a temperature difference which will cause the system to halt operations. The initial five minute period allows for the equalization of temperature differences that naturally occur when no water flow is present. Typically, a finite period of time is required for plumbing fixtures to warm and cool and for the temperature sensor to react to its surroundings.

Figure 9:
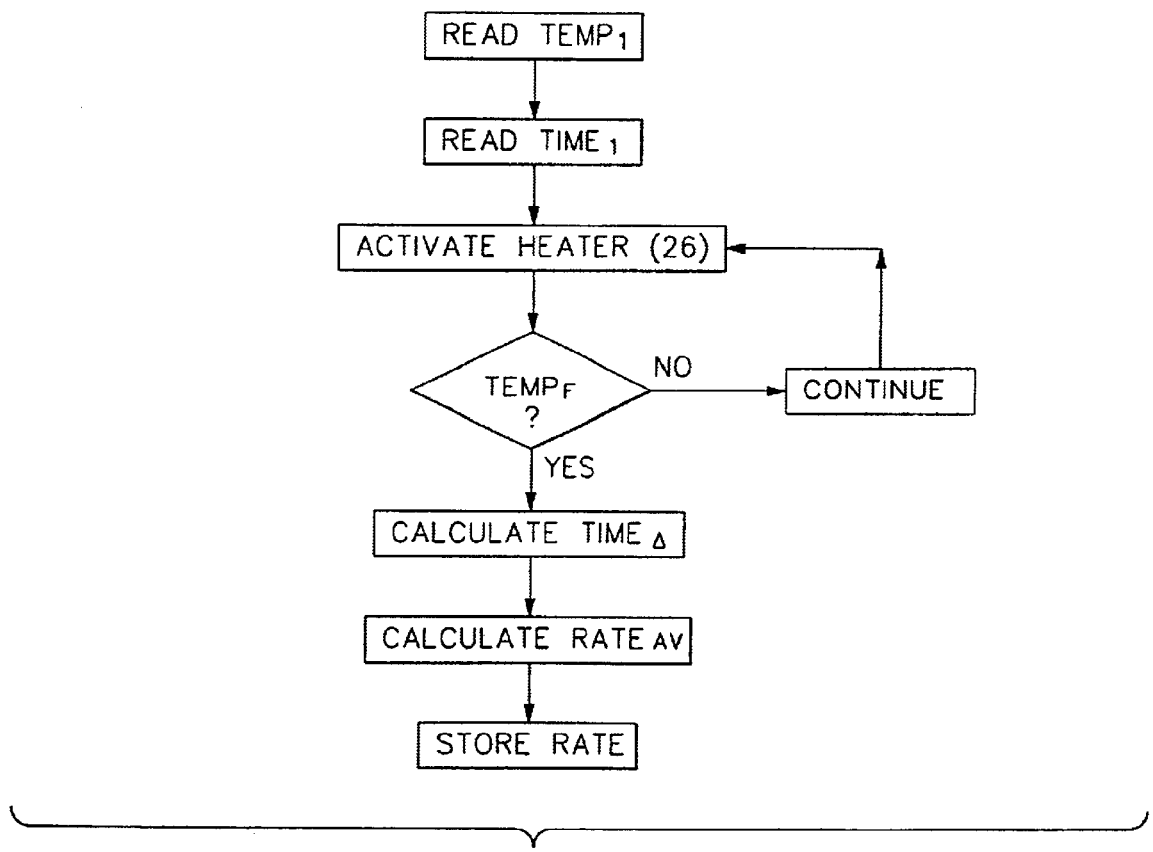

In addition, the microcomputer 10 can calculate the rate of heating detected by either sensor to determine whether there may be fluid blockage in the spa system. This calculation can be performed by dividing the change in temperature by the change in time to compute the rate of heating. For example, if there is a fluid blockage in the system, the spa water surrounding the heating element of heater 26 may rapidly overheat to create a "hot spot" in the spa system. If the temperature of the water does not increase, there may be a malfunction in the heating element. If any error is detected which signifies that the spa system is not properly working, the microcomputer 10 can deactivate the heating element to prevent overheating of the components of the spa system or can signal an error code on the display. The rate of heating can also be monitored to ensure that scalding water is not unexpectedly circulated in contact with the spa user. A cumulative average rate of heating for the spa system can be calculated from the heating rates which are calculated each time that the spa temperature is increased. This function of the invention is shown in FIG. 9.

In one embodiment of the invention, the temperature of the water can be maintained within a selected temperature range or hysteresis when the spa is unattended, and the system can be programmed to heat the water temperature to a selected amount at a desired time. This function, referred to as the scheduled heating function, is begun by setting the start time and the high and low temperature limits. Next, the function is enabled. For example, the operator might select a lower temperature range, while the spa is unattended, to conserve energy. A lower temperature range would also reduce the number of times that the spa system would cycle on and off to maintain the desired temperature, if the lower water temperature is closer to the ambient temperature. Conversely, the operator can select a higher temperature range, closer to the desired temperature of the spa water, to minimize the time required to heat the spa water to the selected operating temperature. The ability to control the temperature of the water while the spa is unattended also yields other useful benefits. For example, the spa system can be programmed to heat the water to a desired temperature at a time of day when electrical power rates are minimal. The heat loss of the spa system during periods when the spa is unattended, calculated from the time that the spa water is heated to the desired temperature, can be calculated to maximize the operating efficiency of the entire spa system.

Figure 10:
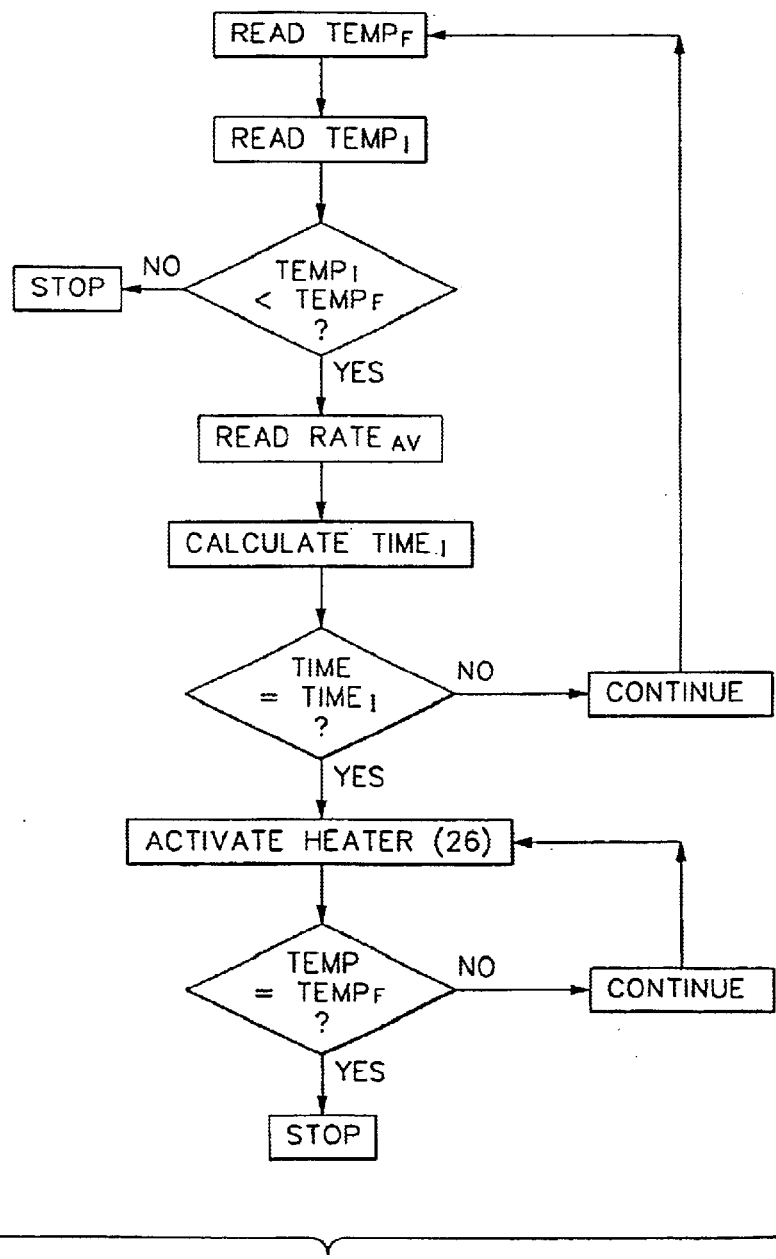

In another embodiment of the invention, the heating rate of the water can be monitored to calculate the estimated time necessary to raise the water temperature to a desired level, and to detect certain failures in the spa system. For example, a sudden increase in the water temperature at a specific point in the spa system may signal that there is a loss of water circulation. If a sensor detects a heating rate which exceeds a selected rate, a warning message may be displayed, or the heating element of heater 26 or the entire spa system may be deactivated to prevent deleterious heating of the spa components. As previously set forth, the rate of heating, together with the actual temperature reading and volume of water in the spa system, can be used to calculate the time required to heat the spa water to a desired temperature. This information can be stored in the microcomputer to assist in predicting the time necessary to heat the spa water to the desired temperature, beginning with the initial temperature of the water when the spa is unattended. This function is shown in FIG. 10.

Figure 11:
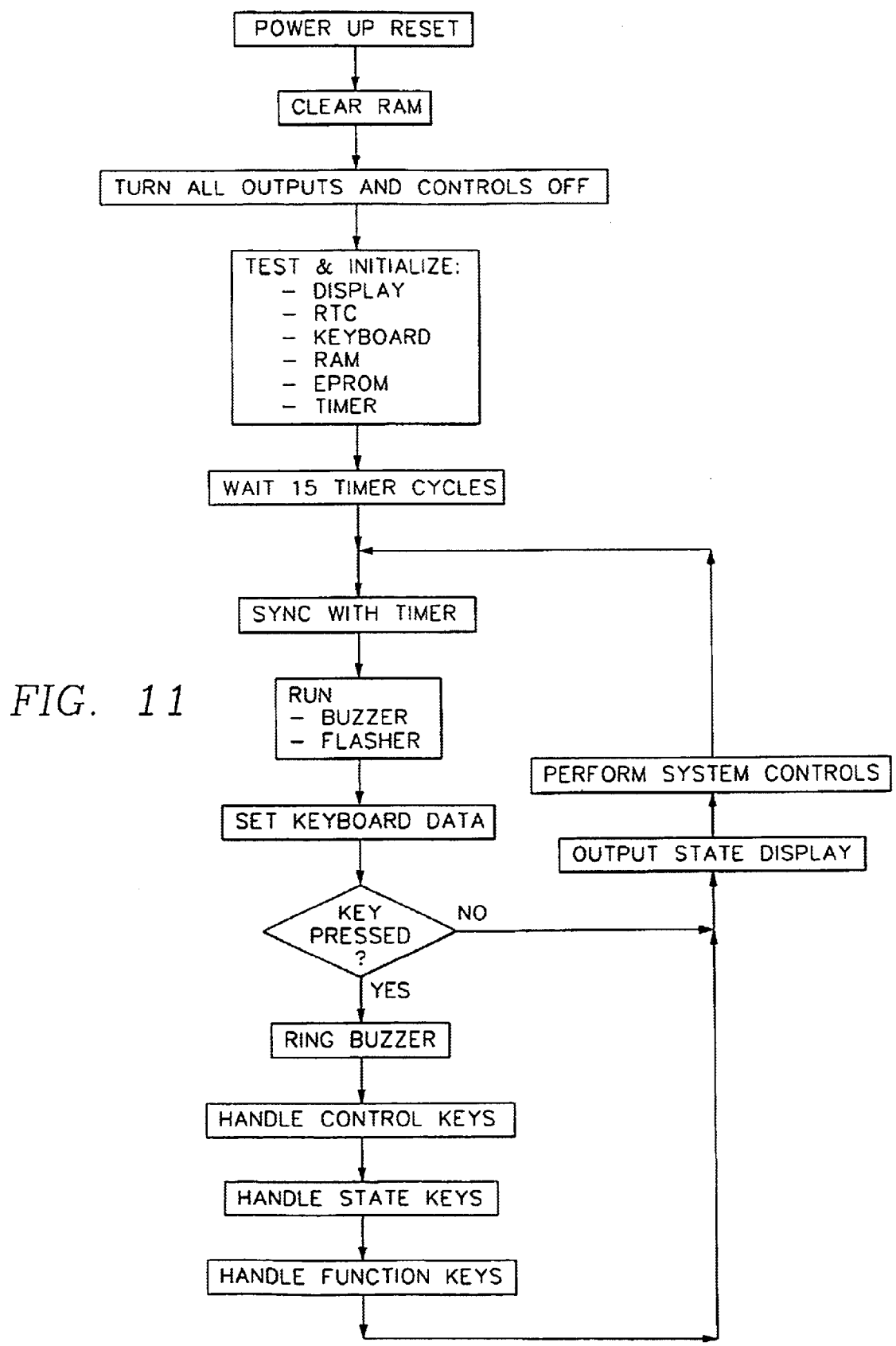

To further illustrate the spa control system and certain of its functions, FIG. 11 shows a flowchart for one embodiment of the system which illustrates Power-up/Reset function, which describes how the system is initiated and can be modified by one operator; FIG. 12 shows a flowchart for the Timer Interrupt function, which interrupts a programmed command; and FIG. 13 shows a flowchart for the Powerfail function, which shuts down certain components of the system upon a certain event. As with other embodiments illustrated herein, the flowcharts shown in FIGS. 11-13 represent differing embodiments of the present invention and may be varied without departing from the scope of the invention.

The embodiments shown above are merely illustrative of the present invention. Many other examples of the embodiments set forth above and other modifications to the spa control system may be made without departing from the scope of this invention. It is understood that the details shown herein are to be interpreted as illustrative and not in a limiting sense.

What is claimed is:

1. A control system for a water spa adapted to remain substantially continuously filled with water between uses and capable of outside use, comprising:

an electrical power source for providing energy to the spa;

a system interconnection panel in electrical communication with the power source, the system interconnection panel including a microprocessor and a step-down power supply for providing energy to the microprocessor;

an electric resistive heating element for heating the water, the heating element in electrical communication with the interconnection panel;

a first electronic solid state temperature sensor for detecting the temperature of the water in the spa; and a second electronic solid state temperature sensor for detecting the temperature of the water proximate the heating element.

2. The control system of claim 1, wherein the first and second temperature sensors are in electrical communication with the interconnection panel.

3. The control system of claim 2, wherein the microprocessor is adapted to generate a signal capable of turning the heating element on or off.

4. The control system of claim 3, wherein the water flows past the heating element, the first temperature sensor detects the water upstream of the heating element, and the second senor detects the temperature of the water downstream of the heating element.

5. The control system of claim 4, wherein the microcomputer is adapted to receive a signal from the first temperature sensor that is indicative of the temperature of the water at the location of the first temperature sensor and a signal from the second temperature sensor that is indicative of the temperature of the water at the location of the second temperature sensor, and to calculate the difference between the temperature at the first sensor and the temperature at the second sensor.

6. The control system of claim 5, wherein the microprocessor is adapted to generate a signal capable of turning the heating element off when the difference between the temperature at the first sensor and the temperature at the second sensor exceeds a predetermined amount.

7. The control system of claim 1, further comprising a control panel capable of displaying alphanumeric characters.

8. The control system of claim 7, wherein the control panel is in electrical communication with the interconnection panel.

9. The control system of claim 8, wherein the microprocessor is adapted to generate a signal to control the alphanumeric characters displayed on the control panel.

10. The control system of claim 1, wherein the step-down power supply is adapted to convert energy supplied by the power source into a lower power and a lower voltage as required by one or more electronic components connected thereto.

11. The control system of claim 1, wherein a ground fault circuit interrupter is electrically interposed between the electrical power source and the system interconnection panel.

12. The control system of claim 1, further comprising a pump, wherein the pump is in electrical communication with the interconnection panel.

13. The control system of claim 1, further comprising converter circuitry associated with the microprocessor capable of converting analog input to digital information.

14. The control system of claim 13, further comprising means for converting the digital information to engineering units.

15. The control system of claim 14, further comprising a control panel capable of displaying alphanumeric characters, and a display interface capable of causing the engineering units to be displayed on the control panel.

16. The control system of claim 14, wherein the means for converting includes a curve fitting algorithm.

17. The control system of claim 1, further comprising an additional sensor.

18. The control system of claim 17, wherein the additional sensor is adapted to produce a signal indicative of the presence or the absence of water flow.

19. The control system of claim 17, wherein the additional sensor is adapted to produce a signal indicative of the presence or the absence of water.

20. A water spa for bathing, comprising:

an open container adapted to remain substantially continuously filled with water between uses, wherein the container is also adapted for outside use;

an electrical power source for providing energy;

a system interconnection panel in electrical communication with the power source, the system interconnection panel including a microprocessor and a step-down power supply for providing energy to the microprocessor;

an electric resistive heating element for heating the water, the heating element in electrical communication with the interconnection panel;

a first electronic solid state temperature sensor for detecting the temperature of the water in the container; and a second electronic solid state temperature sensor for detecting the temperature of the water proximate the heating element.

21. The spa of claim 20, wherein the first and second temperature sensors are in electrical communication with the interconnection panel.

22. The spa of claim 21, wherein the microprocessor is adapted to generate a signal capable of turning the heating element on or off.

23. The spa of claim 22, wherein the water flows past the heating element, the first temperature sensors detects the water upstream of the heating element, and the second sensor detects the temperature of the water downstream of the heating element.

24. The spa of claim 23, wherein the microcomputer is adapted to receive a signal from the first temperature sensor that is indicative of the temperature of the water at the location of the first temperature sensor and a signal from the second temperature sensor that is indicative of the temperature of the water at the location of the second temperature sensor, and to calculate the difference between the temperature at the first sensor and the temperature at the second sensor.

25. The spa of claim 24, wherein the microprocessor is adapted to generate a signal capable of turning the heating element off when the difference between the temperature at the first sensor and the temperature at the second sensor exceeds a predetermined amount.

26. The spa of claim 20, further comprising a control panel capable of displaying alphanumeric characters.

27. The spa of claim 26, wherein the control panel is in electrical communication with the interconnection panel.

28. The spa of claim 27, wherein the microprocessor is adapted to generate a signal to control the alphanumeric characters displayed on the control panel.

29. The spa of claim 20, wherein the step-down power supply is adapted to convert energy supplied by the power source into a lower power and a lower voltage as required by one or more electronic components connected thereto.

30. The spa of claim 20, wherein a ground fault circuit interrupter is electrically interposed between the electrical power source and the system interconnection panel.

31. The spa of claim 20, further comprising a pump, wherein the pump is in electrical communication with the interconnection panel.

32. The spa of claim 20, further comprising converter circuitry associated with the microprocessor capable of converting analog input to digital information.

33. The spa of claim 32, further comprising means for converting the digital information to engineering units.

34. The spa of claim 33, further comprising a control panel capable of displaying alphanumeric characters, and a display interface capable of causing the engineering units to be displayed on the control panel.

35. The spa of claim 33, wherein the means for converting include a curve fitting algorithm.

36. The spa of claim 20, further comprising an additional sensor.

37. The spa of claim 36, wherein the additional sensor is adapted to produce a signal indicative of the presence or the absence of water flow.

38. The spa of claim 36, wherein the additional sensor is adapted to produce a signal indicative of the presence or the absence of water.

* * * * *

UNITED STATES PATENT AND TRADEMARK OFFICE
CERTIFICATE OF CORRECTION

PATENT NO. : 6,965,815 B1
APPLICATION NO. : 10/043799
DATED : November 15, 2005
INVENTOR(S) : Michael E. Tompkins and Michael J. Green It is certified that error appears in the above-identified patent and that said Letters Patent is hereby corrected as shown below:

On Title Page
Item (73) Assignee, delete "Bilboa" and insert --Balboa--.

On Title Page
Item (56) References Cited: U.S. PATENT DOCUMENTS,
3,781,925 A, delete "4/443" and insert --4/493--.
4,489,235 A, delete "249/437" and insert --219/437--.
4,700,884 A, delete "236/121.2" and insert --236/12.12--.

On Title Page
Item (56) References Cited: OTHER PUBLICATIONS,
Page 3, Col. 2
Line 47, delete "Compliant" and insert --Complaint--.

Page 4, column 1,
Line 8, delete "Jospeh" and insert --Joseph--.
Line 11, delete "Patens" and insert --Patents--.
Line 11, delete "SAVC" and insert --SACV--.
Line 14, delete "Compliant" and insert --Complaint--.

Column 1,
Line 62, delete "sap" and insert --spa--.

Column 5,
Line 8, delete "20, 22" and insert --20, 21, 22--.

Column 8,
Line 43, delete "fo" and insert --of--.

Column 9,
Line 17, delete "(spa temperature)" and insert --(spa temperature 21)--.

Column 11,
Line 61, delete "CTLERR-routine" and insert --CTLERR – routine--.
Line 66, delete "CTLKEY-routine" and insert --CTLKEY – routine--.

UNITED STATES PATENT AND TRADEMARK OFFICE
CERTIFICATE OF CORRECTION

PATENT NO. : 6,965,815 B1
APPLICATION NO. : 10/043799
DATED : November 15, 2005
INVENTOR(S) : Michael E. Tompkins and Michael J. Green It is certified that error appears in the above-identified patent and that said Letters Patent is hereby corrected as shown below:

Column 16,
Line 25, delete "system invention" and insert --present invention--.
Line 28, delete "thetemperature" and insert --the temperature--.
Line 28, delete "thewater" and insert --the water--.
Line 31, delete "th container" and insert --the container--.
Line 37, delete "th various" and insert --the various--.
Line 53, delete "pump 49" and insert --pump 24--.

Column 17,
Line 20, delete "reset 104" and insert --reset at 104--.

Column 18,
Line 35, delete "switch in the" and insert --switch 31 in the--.
Line 49, delete "elimiante" and insert --eliminate--.

Column 19,
Line 14, delete "ten" and insert --tend--.

Column 21,
Line 42, delete "senor" and insert --sensor--.

Signed and Sealed this

Thirteenth Day of March, 2007

JON W. DUDAS
*Director of the United States Patent and Trademark Office*